(12) United States Patent
Preuss et al.

(10) Patent No.: US 12,228,049 B2
(45) Date of Patent: *Feb. 18, 2025

(54) COMPONENTS FOR GAS TURBINE ENGINES

(71) Applicant: RTX Corporation, Farmington, CT (US)

(72) Inventors: Daniel P. Preuss, Glastonbury, CT (US); Dominic J. Mongillo, Jr., West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,493

(22) Filed: Jan. 30, 2023

(65) Prior Publication Data

US 2023/0243267 A1 Aug. 3, 2023

Related U.S. Application Data

(60) Provisional application No. 63/304,271, filed on Jan. 28, 2022.

(51) Int. Cl.
*F01D 5/18* (2006.01)
*F01D 9/06* (2006.01)

(52) U.S. Cl.
CPC ............. *F01D 5/189* (2013.01); *F01D 9/065* (2013.01); *F01D 5/186* (2013.01);
(Continued)

(58) Field of Classification Search
CPC .......... F01D 5/188; F01D 5/189; F01D 5/186; F01D 9/065; F05D 2240/126;
(Continued)

(56) References Cited

U.S. PATENT DOCUMENTS

| | | | | | |
|---|---|---|---|---|---|
| 3,388,888 A | * | 6/1968 | Kercher | .................. | F01D 5/189 |
| | | | | | 415/115 |
| 4,183,716 A | * | 1/1980 | Takahara | ................ | F01D 5/189 |
| | | | | | 415/115 |

(Continued)

FOREIGN PATENT DOCUMENTS

DE  4447515 C2  2/1999

OTHER PUBLICATIONS

International Search Report for International Application No. PCT/US2023/011849; Date of Search Jan. 31, 2024; 6 pages.

(Continued)

*Primary Examiner* — Christopher Verdier
(74) *Attorney, Agent, or Firm* — CANTOR COLBURN LLP

(57) ABSTRACT

Baffles for installation within airfoils include a baffle body defining a feed cavity and extending between inner and outer diameter ends. A forward standoff shelf is formed along an exterior surface of the baffle and defined by a depression, bend, or channel in a material of the baffle body extending between the inner and outer diameter ends. The forward standoff shelf is configured to engage with a forward rail of the airfoil body, and an aft standoff shelf is formed along an exterior surface of the baffle body and configured to engage with an aft rail of the airfoil body. A surface of the baffle body between the forward standoff shelf and the aft standoff shelf defines a side channel surface extending in a radial direction along the baffle body between the outer diameter end and the inner diameter end.

17 Claims, 14 Drawing Sheets

(52) U.S. Cl.
CPC .. *F05D 2240/121* (2013.01); *F05D 2240/122* (2013.01); *F05D 2240/123* (2013.01); *F05D 2240/126* (2013.01); *F05D 2240/127* (2013.01); *F05D 2260/201* (2013.01); *F05D 2260/202* (2013.01); *F05D 2260/205* (2013.01); *F05D 2260/22141* (2013.01)

(58) Field of Classification Search
CPC ..... F05D 2260/22141; F05D 2240/127; F05D 2260/202; F05D 2260/204; F05D 2260/205
See application file for complete search history.

(56) References Cited

U.S. PATENT DOCUMENTS

| | | | |
|---|---|---|---|
| 5,533,864 A | 7/1996 | Nomoto et al. | |
| 7,497,655 B1 | 3/2009 | Liang | |
| 8,043,057 B1* | 10/2011 | Liang | F01D 9/041 |
| | | | 416/96 A |
| 8,070,442 B1* | 12/2011 | Liang | F01D 5/187 |
| | | | 416/97 R |
| 8,162,617 B1* | 4/2012 | Davies | F01D 5/189 |
| | | | 416/223 R |
| 9,840,930 B2 | 12/2017 | Lee et al. | |
| 11,781,434 B2* | 10/2023 | Preuss | F01D 5/186 |
| | | | 415/115 |
| 2014/0234088 A1* | 8/2014 | Brandl | F01D 5/30 |
| | | | 415/177 |
| 2018/0135432 A1 | 5/2018 | Martin, Jr. et al. | |
| 2020/0182071 A1 | 6/2020 | Spangler et al. | |
| 2023/0243266 A1* | 8/2023 | Preuss | F01D 5/186 |
| | | | 415/115 |

OTHER PUBLICATIONS

Written Opinion for International Application No. PCT/US2023/011849; Date of Search Jan. 31, 2024; 10 pages.
International Preliminary Report on Patentability for PCT Application No. PCT/US2023/011849, dated Aug. 8, 2024, pp. 1-10.

* cited by examiner

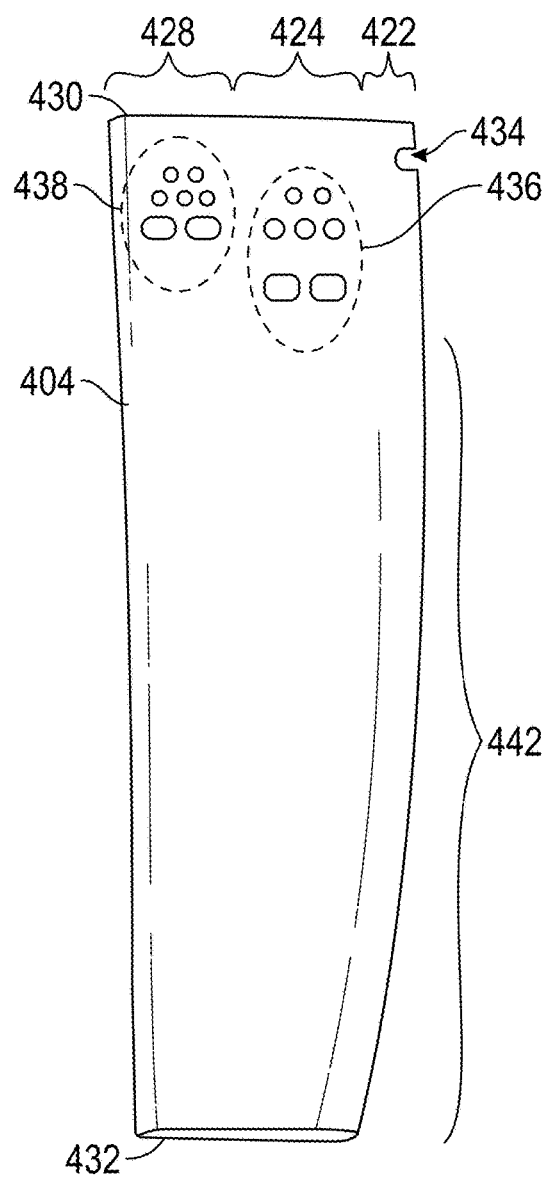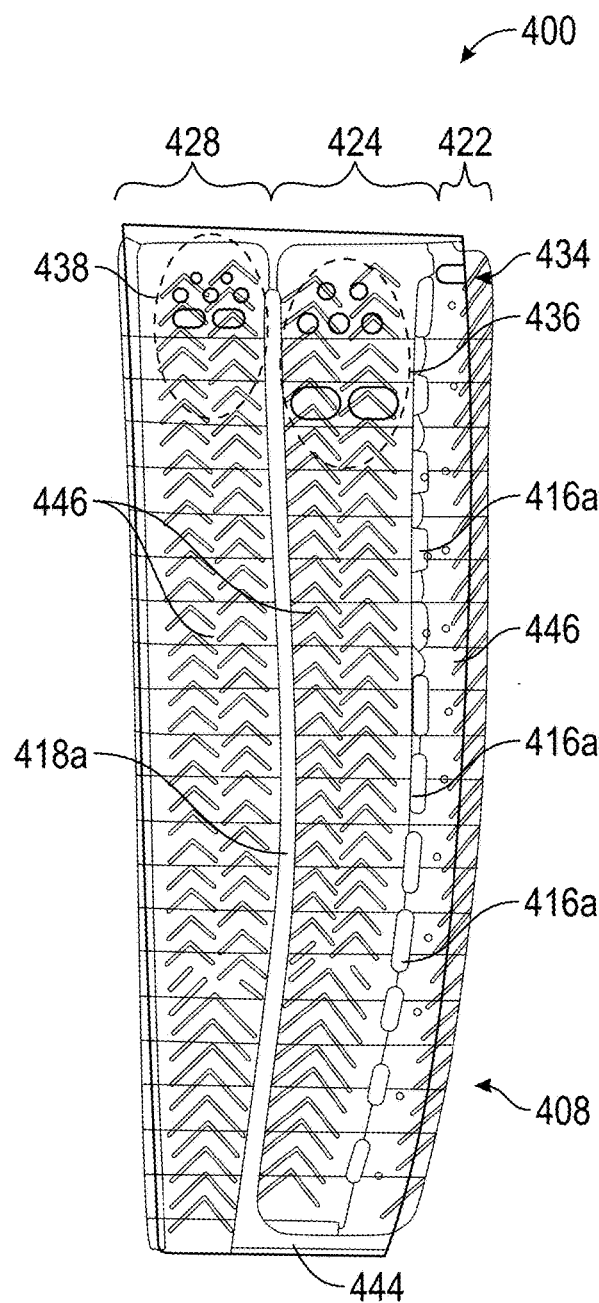
FIG. 4B
FIG. 4C

COMPONENTS FOR GAS TURBINE ENGINES

CROSS-REFERENCE TO RELATED APPLICATIONS

This application claims the benefit of U.S. Provisional Patent Application Ser. No. 63/304,271 filed Jan. 28, 2022, the disclosure of which is incorporated herein by reference in its entirety.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The compressor and turbine sections are typically subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, baffles for installation within leading edge cavities of airfoil bodies are provided. The baffles include a baffle body defining a feed cavity within an interior thereof, the baffle body extending between an outer diameter end and an inner diameter end, a forward standoff shelf formed along an exterior surface of the baffle body, the forward standoff shelf defined by a depression, bend, or channel in a material of the baffle body extending from the outer diameter end to the inner diameter end and configured to engage with a forward rail of the airfoil body, and an aft standoff shelf formed along an exterior surface of the baffle body, the aft standoff shelf defined by a depression, bend, or channel in the material of the baffle body extending from the outer diameter end to the inner diameter end and configured to engage with an aft rail of the airfoil body. A surface of the baffle body between the forward standoff shelf and the aft standoff shelf defines a side channel surface extending in a radial direction along the baffle body between the outer diameter end and the inner diameter end.

In addition to one or more of the features described above, or as an alternative, further embodiments of the baffles may include that the baffle body comprises an aft wall having at least one trailing edge impingement aperture formed thereon.

In addition to one or more of the features described above, or as an alternative, further embodiments of the baffles may include that the leading edge baffle is capped at an inner diameter end thereof.

In addition to one or more of the features described above, or as an alternative, further embodiments of the baffles may include that the baffle body comprises a leading edge feed aperture proximate the outer diameter end, the leading edge feed aperture configured to direct a cooling flow therethrough and along a showerhead channel surface on the exterior of the baffle body.

In addition to one or more of the features described above, or as an alternative, further embodiments of the baffles may include that the baffle body comprises at least one side feed aperture array proximate the outer diameter end, the at least one side feed aperture array configured to direct a cooling flow along a side channel surface on the exterior of the baffle body.

In addition to one or more of the features described above, or as an alternative, further embodiments of the baffles may include at least one resupply aperture on the side channel surface arranged at a position between the at least one side feed aperture array and the inner diameter end of the baffle body.

In addition to one or more of the features described above, or as an alternative, further embodiments of the baffles may include that the forward standoff shelf is a pressure side forward standoff shelf and the aft standoff shelf is a pressure side aft standoff shelf, with a pressure side channel surface defined therebetween on a pressure side of the baffle body.

In addition to one or more of the features described above, or as an alternative, further embodiments of the baffles may include a suction side forward standoff shelf and a suction side aft standoff shelf arranged on a suction side of the baffle body.

In addition to one or more of the features described above, or as an alternative, further embodiments of the baffles may include that a showerhead channel surface is defined on the exterior surface of the baffle body between the suction side forward standoff shelf and the pressure side forward standoff shelf.

In addition to one or more of the features described above, or as an alternative, further embodiments of the baffles may include that an aft channel surface is defined on the exterior surface of the baffle body extending around an aft end of the baffle body between the suction side aft standoff shelf and the pressure side aft standoff shelf.

In addition to one or more of the features described above, or as an alternative, further embodiments of the baffles may include that at least one of the forward standoff shelf or the aft standoff shelf is shaped to receive and engage with a rail of the airfoil body and a standoff gap is defined between the respective standoff shelf and the rail when the baffle is installed within the airfoil body.

In addition to one or more of the features described above, or as an alternative, further embodiments of the baffles may include that the baffle body comprises a solid portion between at least one feed aperture proximate the outer diameter end of the baffle body and the inner diameter end of the baffle body.

According to some embodiments, airfoil assemblies are provided. The airfoil assemblies include an airfoil body defining a leading edge cavity and having a forward radially extending rail and an aft radially extending rail form on an inner surface of the airfoil body that defines the leading edge cavity; and a baffled installed within the leading edge cavity. The baffle includes a baffle body defining a feed cavity within an interior thereof, the baffle body extending between an outer diameter end and an inner diameter end, a forward standoff shelf formed along an exterior surface of the baffle body, the forward standoff shelf defined by a depression, bend, or channel in a material of the baffle body extending from the outer diameter end to the inner diameter end and configured to engage with the forward radially extending rail, and an aft standoff shelf formed along an exterior surface of the baffle body, the aft standoff shelf defined by a depression, bend, or channel in the material of the baffle body extending from the outer diameter end to the inner diameter end and configured to engage with the aft radially extending rail. A surface of the baffle body between the forward standoff shelf and the aft standoff shelf defines a side channel surface extending in a radial direction along the baffle body between the outer diameter end and the inner diameter end.

In addition to one or more of the features described above, or as an alternative, further embodiments of the airfoil assemblies may include that the baffle body comprises an aft wall having at least one trailing edge impingement aperture formed thereon and the airfoil body comprises an interior rib, wherein the at least one trailing edge impingement aperture is configured to direct an impinging flow against the interior rib during use.

In addition to one or more of the features described above, or as an alternative, further embodiments of the airfoil assemblies may include that the leading edge baffle is capped at an inner diameter end thereof.

In addition to one or more of the features described above, or as an alternative, further embodiments of the airfoil assemblies may include that the baffle body comprises a leading edge feed aperture proximate the outer diameter end, the leading edge feed aperture configured to direct a cooling flow therethrough and along a showerhead channel surface on the exterior of the baffle body.

In addition to one or more of the features described above, or as an alternative, further embodiments of the airfoil assemblies may include that the baffle body comprises at least one side feed aperture array proximate the outer diameter end, the at least one side feed aperture array configured to direct a cooling flow along a side channel surface on the exterior of the baffle body.

In addition to one or more of the features described above, or as an alternative, further embodiments of the airfoil assemblies may include that the forward standoff shelf is a pressure side forward standoff shelf and the aft standoff shelf is a pressure side aft standoff shelf, with a pressure side channel surface defined therebetween on a pressure side of the baffle body.

In addition to one or more of the features described above, or as an alternative, further embodiments of the airfoil assemblies may include that at least one of the forward standoff shelf or the aft standoff shelf is shaped to receive and engage with a rail of the airfoil body and a standoff gap is defined between the respective standoff shelf and the rail when the baffle is installed within the airfoil body.

In addition to one or more of the features described above, or as an alternative, further embodiments of the airfoil assemblies may include that the baffle body comprises a solid portion between at least one feed aperture proximate the outer diameter end of the baffle body and the inner diameter end of the baffle body.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

FIG. 4B is a side elevation view of the baffle of FIG. 4A;

FIG. 4C is a side elevation view of the structure of the airfoil body of FIG. 4A;

DETAILED DESCRIPTION

Detailed descriptions of one or more embodiments of the disclosed apparatus and/or methods are presented herein by way of exemplification and not limitation with reference to the Figures.

Figure 1:
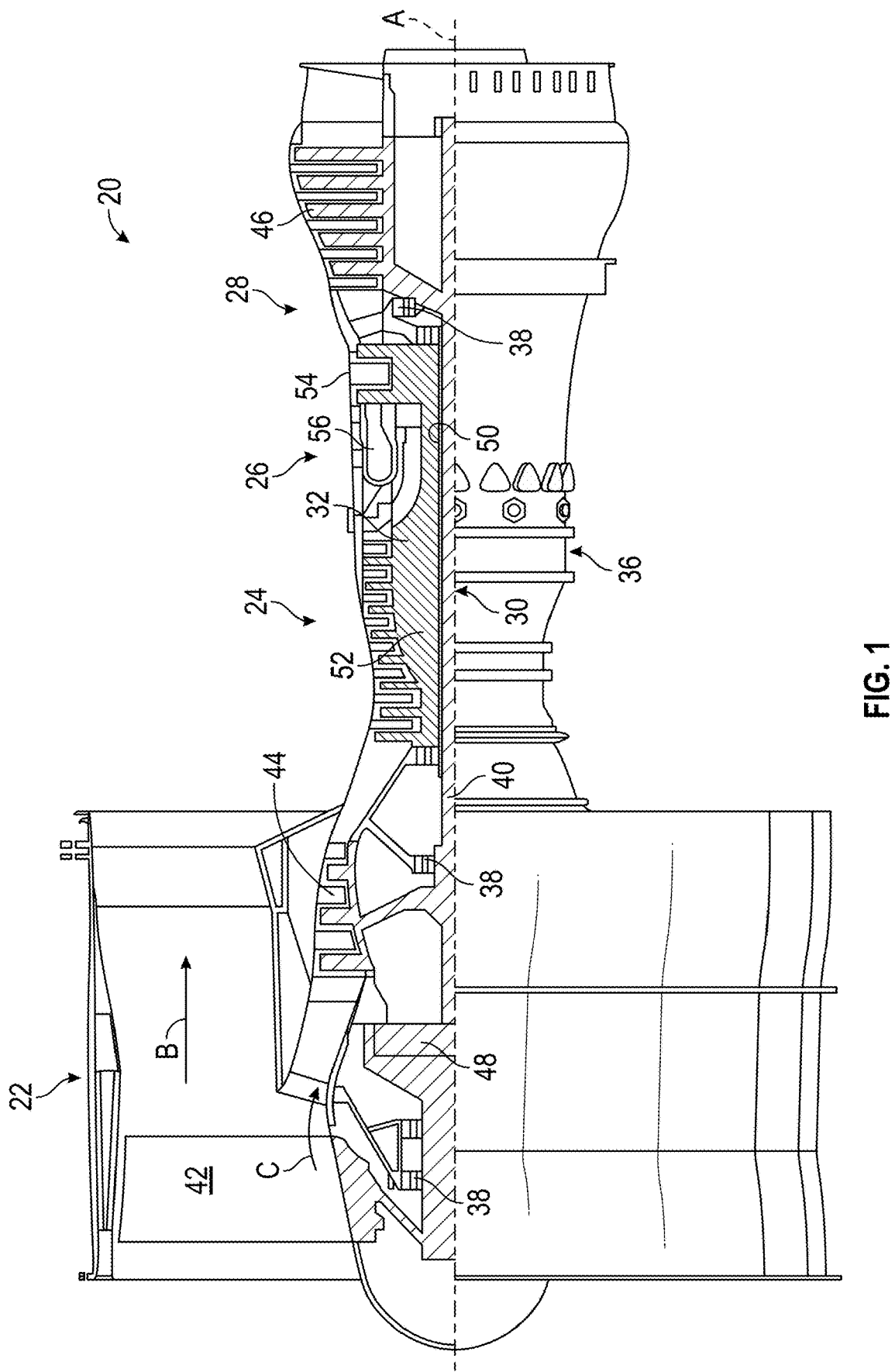
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
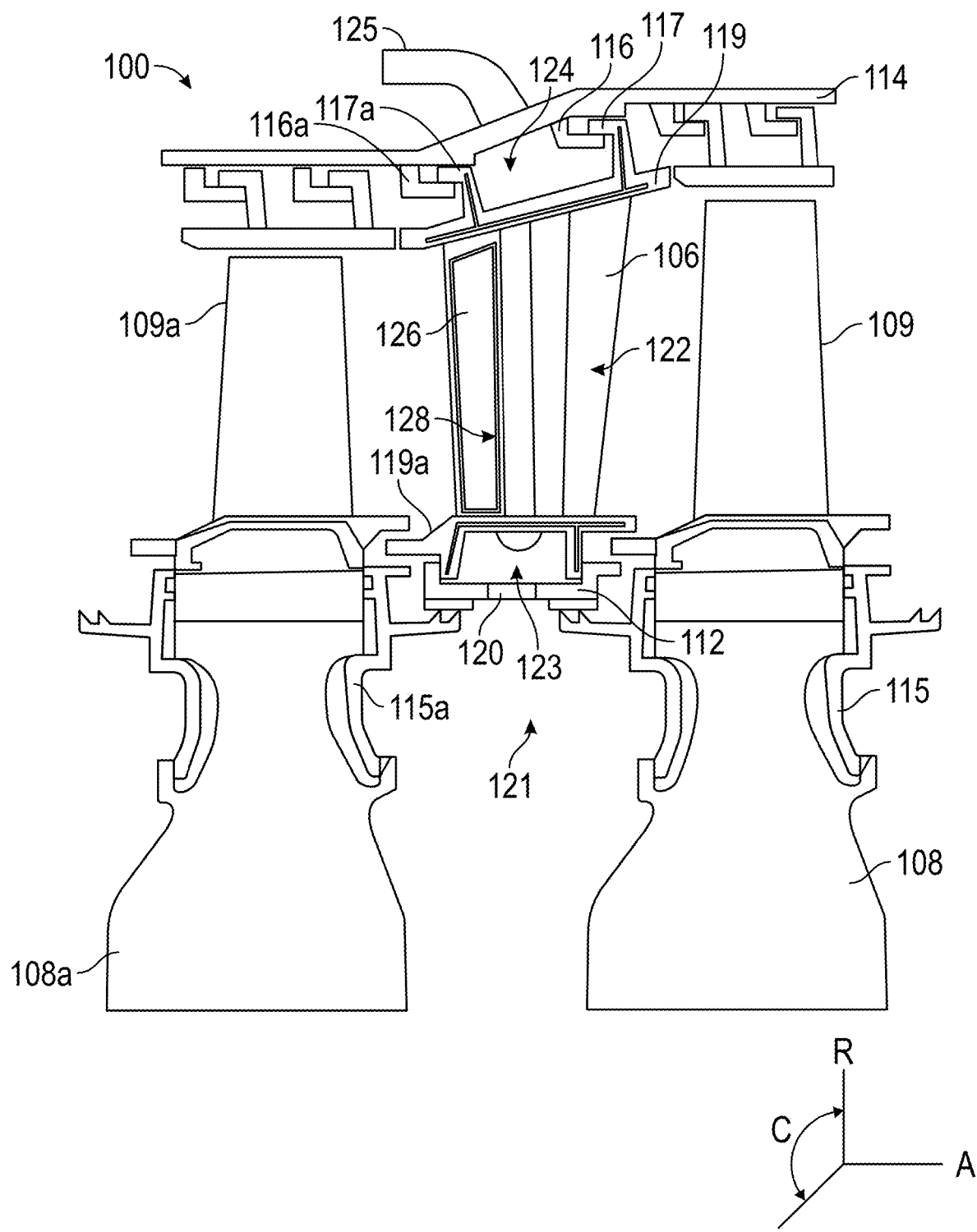
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

Although FIG. 2 depicts a second stage vane, as appreciated by those of skill in the art, embodiments provided herein can be applicable to first stage vanes as well. Such first stage vanes may have cooling flow supplied to the vane at both the inner and outer diameters, as opposed to the through-flow style cavity which goes from, for example, outer diameter to inner diameter. Thus, the present illustrations are not to be limiting but are rather provided for illustrative and explanatory purposes only.

In the present illustration, a turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the vane 106 and/or the platforms 119, 119a may include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in the vane cavity 122 illustrated herein along a longitudinal span of the vane cavity 122 being between such openings, as well as out through a downstream cavity and/or manifold (e.g., vane inner diameter cavity 123).

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting. The TCA conduit 125 may provide cooling air that can flow into the baffles 126 and then impinge from the respective baffle 126 onto an interior surface of the vane 106. In some embodiments, a leading edge cavity (e.g., a vane cavity 122) may be configured as a single flow-through cavity, with cooling flow flowing from the outer diameter vane cavity 124, through the leading edge cavity (providing cooling to the vane), and then into the inner diameter cavity 123. Aft of the leading edge cavity may be one or more main body cavities which may be through-flow cavities or arranged as a serpentine cavity that exits through a trailing edge of the vane 106.

As shown and labeled in FIG. 2, a radial direction R is upward on the page (e.g., radial with respect to an engine axis) and an axial direction A is to the right on the page (e.g., along an engine axis). Thus, radial cooling flows will travel vertically/radially up or down on the page and axial flows will travel horizontally/axially left-to-right (or vice versa). A circumferential direction C is a direction into and out of the page about the engine axis.

Figure 3A:
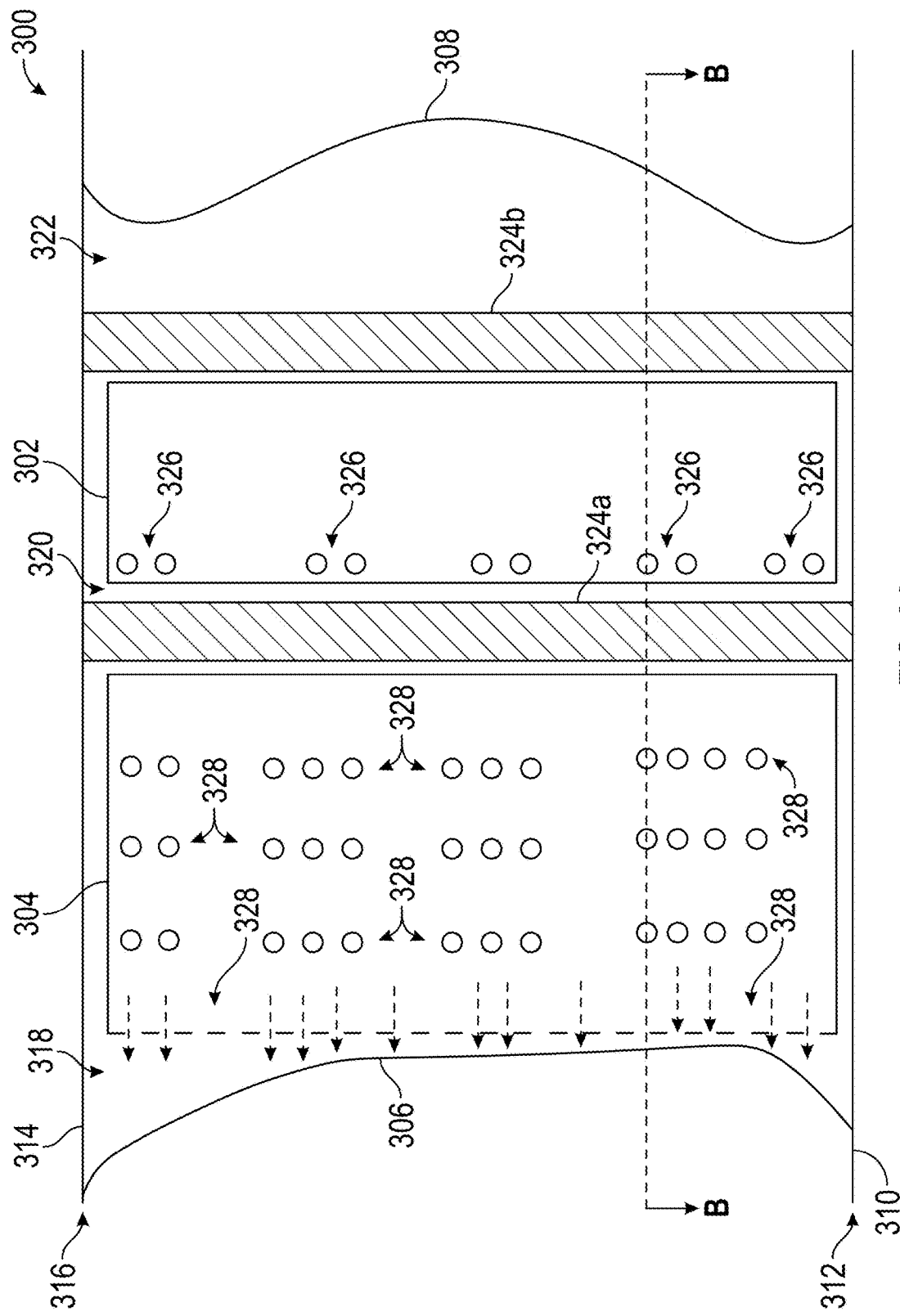
FIG. 3A is an axial cross-section schematic illustration of an airfoil.
Figure 3B:
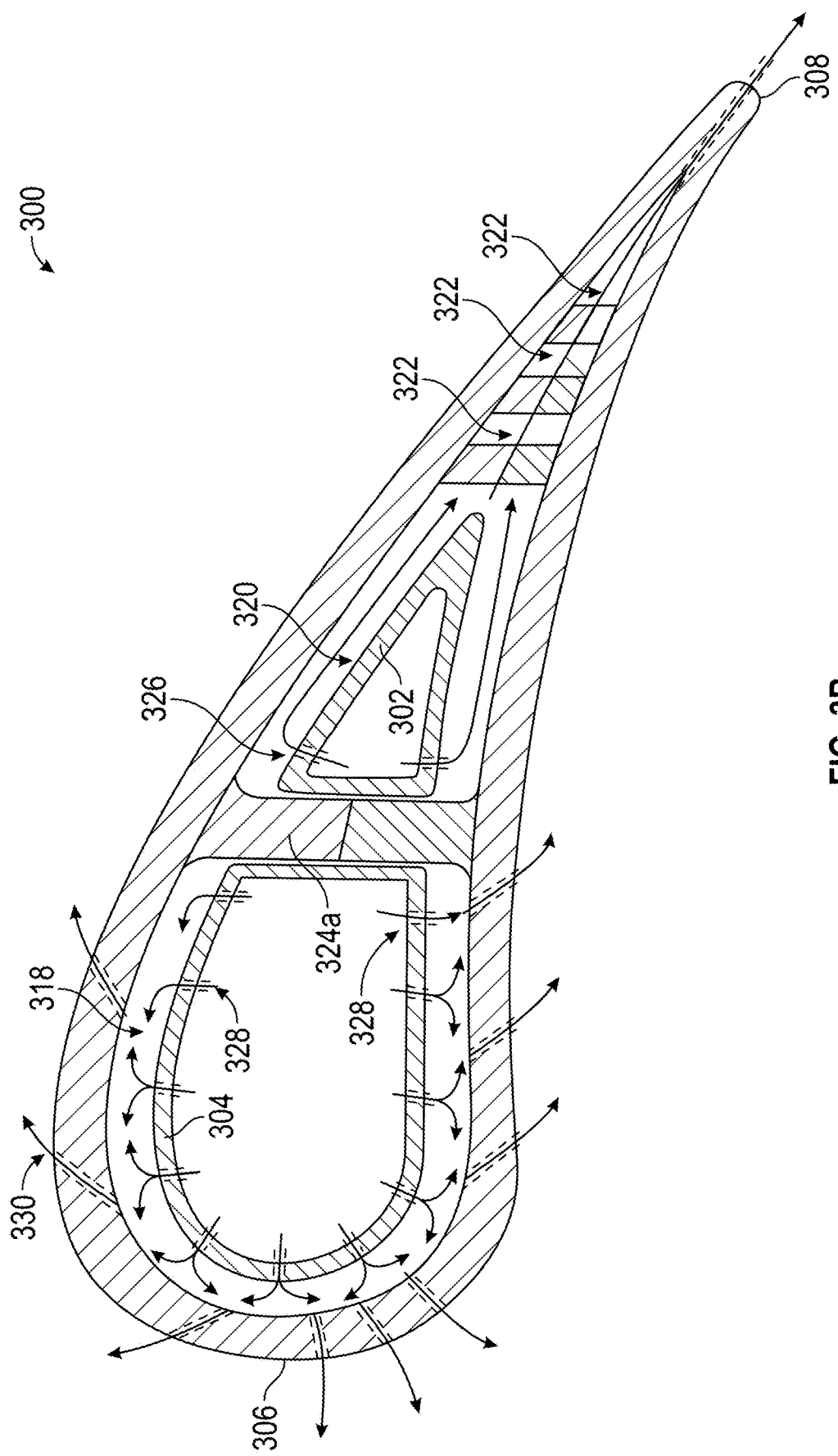
FIG. 3B is a cross-sectional illustration of the airfoil of FIG. 3A as viewed along the line B-B of FIG. 3A.

Turning now to FIGS. 3A-3B, schematic illustrations of an airfoil 300 having a mid-cavity baffle 302 and a leading edge cavity baffle 304 installed therein are shown. Each baffle 302, 304 has a baffle body that defines the structure and shape of the respective baffle 302, 304. The airfoil 300 extends in an axial direction between a leading edge 306 and a trailing edge 308. In a radial direction, the airfoil 300 extends between an inner platform 310 at an inner diameter 312 and an outer platform 314 at an outer diameter 316. In this illustrative embodiment, the airfoil 300 has three internal cavities: a leading edge cavity 318, a mid-cavity 320, and a trailing edge cavity 322. Although shown with a specific cavity configuration, those of skill in the art will appreciate that airfoils can have a variety of internal cavity configurations and implement embodiment of the present disclosure. Thus, the present illustration is merely for explanatory purposes and is not to be limiting. FIG. 3A is an axial cross-section illustration of the airfoil 300 illustrating an internal structure thereof. FIG. 3B is a cross-sectional illustration as viewed along the line B-B. It will be appreciated by those of ordinary skill in the art that a typical metallic airfoil (e.g., Ni-base airfoil) will include internal features such as trip strips, pin fins, pedestals, hemispherical bumps, delta fins, or other types of heat transfer augmentation features cast into the interior wall surfaces of internal cavities and/or the inserted baffles include impingement holes for enabling impinging air to cool the interior surfaces of the airfoil.

One or more of the cavities 318, 320, 322 may be separated by one or more ribs 324a, 324b with fluid connections therebetween in some embodiments. The ribs 324a, 324b extend radially between the inner platform 310 at the inner diameter 312 to the outer platform 314 at the outer diameter 316. A first rib 324a may separate the mid-cavity 320 from the leading edge cavity 318, and may, in some embodiments, fluidly separate the two cavities 318, 320. A second rib 324b may separate the mid-cavity 320 from the trailing edge cavity 322, and may, in some embodiments, have through holes to fluidly connect the mid-cavity 320 to the trailing edge cavity 322. In some embodiments, the cavities 318, 320, 322 may include one or more heat transfer augmentation features, such as trip strips, pedestals, pin fins, etc. included in the airfoil body (i.e., cast in) and/or attached to the interior wall surfaces.

In this embodiment, the leading edge cavity 318 includes a leading edge cavity baffle 304 installed therein and the mid-cavity 320 includes a mid-cavity baffle 302 therein. The mid-cavity baffle 302 includes mid-cavity baffle apertures 326 (shown in FIG. 3B) to supply cooling air from within the mid-cavity baffle 302 into the mid-cavity 320. The cooling air within the mid-cavity 320 may flow into the trailing edge cavity 322 and subsequently exit the airfoil 300 through a discharge slot of the trailing edge 308. Such discharge slot of the trailing edge 308 may include various internal cooling features to provide an appropriate air flow distribution in order to provide adequate thermal cooling effectiveness in order to achieve local metal temperature, durability life, and aerodynamic performance characteristics. The leading edge cavity baffle 304 includes leading edge cavity baffle apertures 328 where cooling air within the leading edge cavity baffle 304 may impinge upon surfaces of the airfoil 300 of the leading edge cavity 318. The cooling or impinged air may then exit the leading edge cavity 318 through film cooling apertures 330, as will be appreciated by those of skill in the art.

Embodiments of the present disclosure are directed to optimization of heat transfer within a vane by minimizing cross-sectional area and providing cooling to the hottest area of the airfoil, namely the airfoil leading edge, as well as the airfoil pressure side surface and the airfoil suction side surface. This is especially useful for later stage airfoils that may not be supplied with high enough flow allotments for adequate cooling or pressure levels that may exist in more typical configurations. Embodiments of the present disclosure are directed to combining a space-eater baffle with cast-in standoff features of a vane to create multiple radial extending channels. The radial extending channels may be supplied with cooling air that enters the vane from either the outer diameter or the inner diameter of the airfoil. This cooling flow may be bled into a showerhead region of the vane and/or passed through the baffle (or vane) to feed an inner diameter platform or downstream components. The flow-bleed functionality is a product of the use of pedestal standoffs of the airfoil which mate up against the baffle during operation in order to control the rate of migration of the flow from radially partitioned channels into the showerhead region to then dump the flow into the gas-path. Embodiments of the present disclosure provide a robust vane cooling configuration with cast-in features and impingement feeds that are drilled into the baffle. The impingement feeds can be tailored to address high heat-load areas, for example.

In certain engine and/or airfoil configurations, flow allotment and pressure levels may not allow for traditional leading edge cooling configurations (e.g., peanut cavity and/or impingement baffle). For example, in some non-limiting engine configurations, a second stage vane assembly (i.e., aft of a first stage vane assembly) may receive about one third or less of the amount of cooling flow extracted for the first stage vane assembly. As such, the first stage vane assembly may employ conventional impingement baffles due to the high flow level. However, the lower amount of cooling flow at the downstream second stage vane assembly may require additional features because pure impingement cooling configurations may not be viable due to the lower flow levels at the second stage (aft) vane assembly.

Additionally, structural concerns may require a vane structure that maximizes the distance between the leading edge and the first rib within the airfoil (e.g., forming a large axial extent leading edge cavity). In order to optimize heat transfer in such airfoils, a radially flowing space-eater baffle is implemented in conjunction with standoffs that are formed on the interior walls of the airfoil body. The baffle enables optimization of channel cooling flow area (in the flow direction) in lieu of using cast-in ribs and the radial (rather than axial) flow orientation further reduces the overall cross-sectional area that drives heat transfer. The radially extending standoffs of the airfoil may be used to segregate cooling channels in a way that optimizes heat transfer. Such cooling channels are defined between an exterior surface of the baffle and an interior surface (e.g., hot wall) of the airfoil body. The use of unique pedestal standoffs can be employed to bleed flow to a showerhead region to feed cooling holes of the airfoil. Pedestal bleed area distribution can be tailored such that heat transfer requirements are met both in the radial channel(s) and a showerhead region of the airfoil. In some embodiments, baffle resupply holes can be added to address specific areas of high heat-load, introducing impingement cooling while pedestals manage the rate at which the cooler air migrates to and mixes in the showerhead region. Baffle impingement feeds can be tailored to optimize heat transfer and fill characteristics of the radial channel(s). Additionally, a number of impingement holes may be utilized on the cold-rib side of the baffle (e.g., aft-facing) to create a fluidic wall, discouraging communication between pressure side and suction side channels along the aft portion of the leading edge cavity.

Figure 4A:
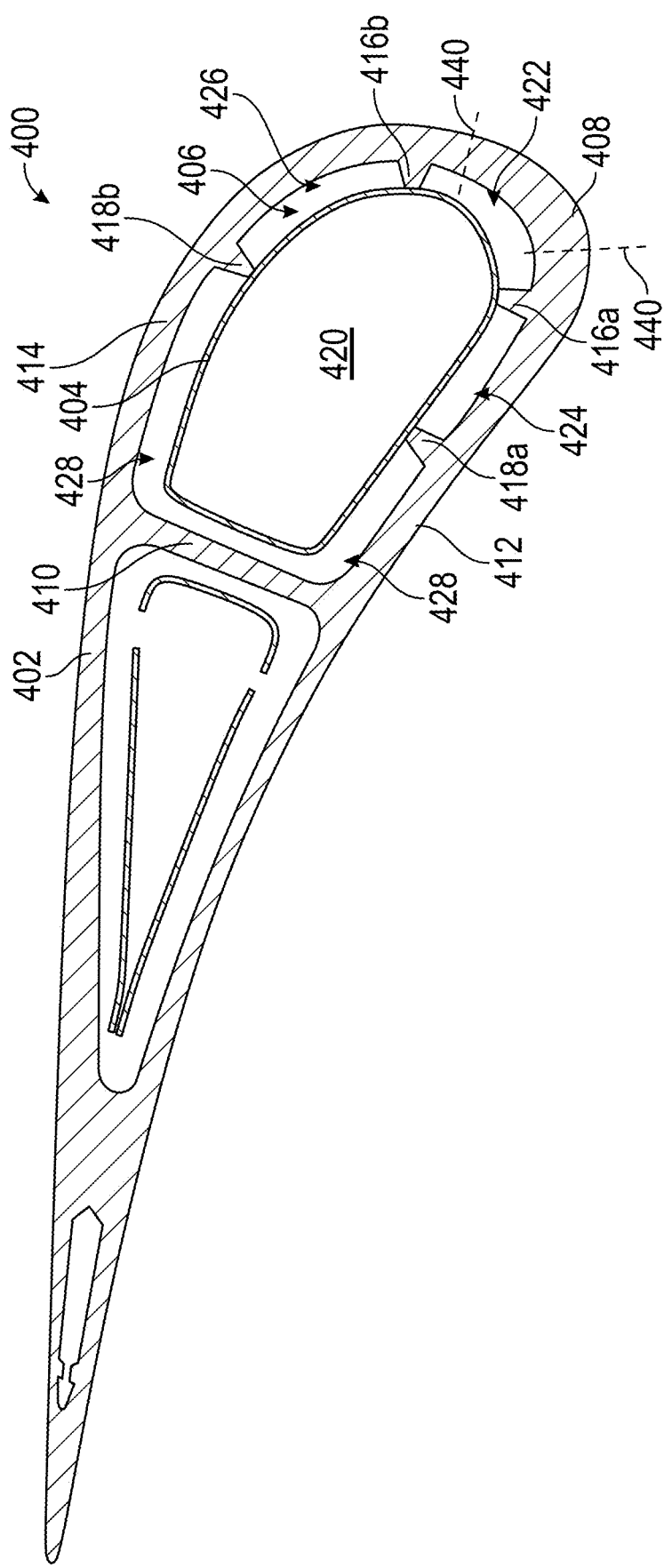
FIG. 4A is a schematic illustration of an airfoil assembly having an airfoil body and a baffle in accordance with an embodiment of the present disclosure.
Figure 4D:
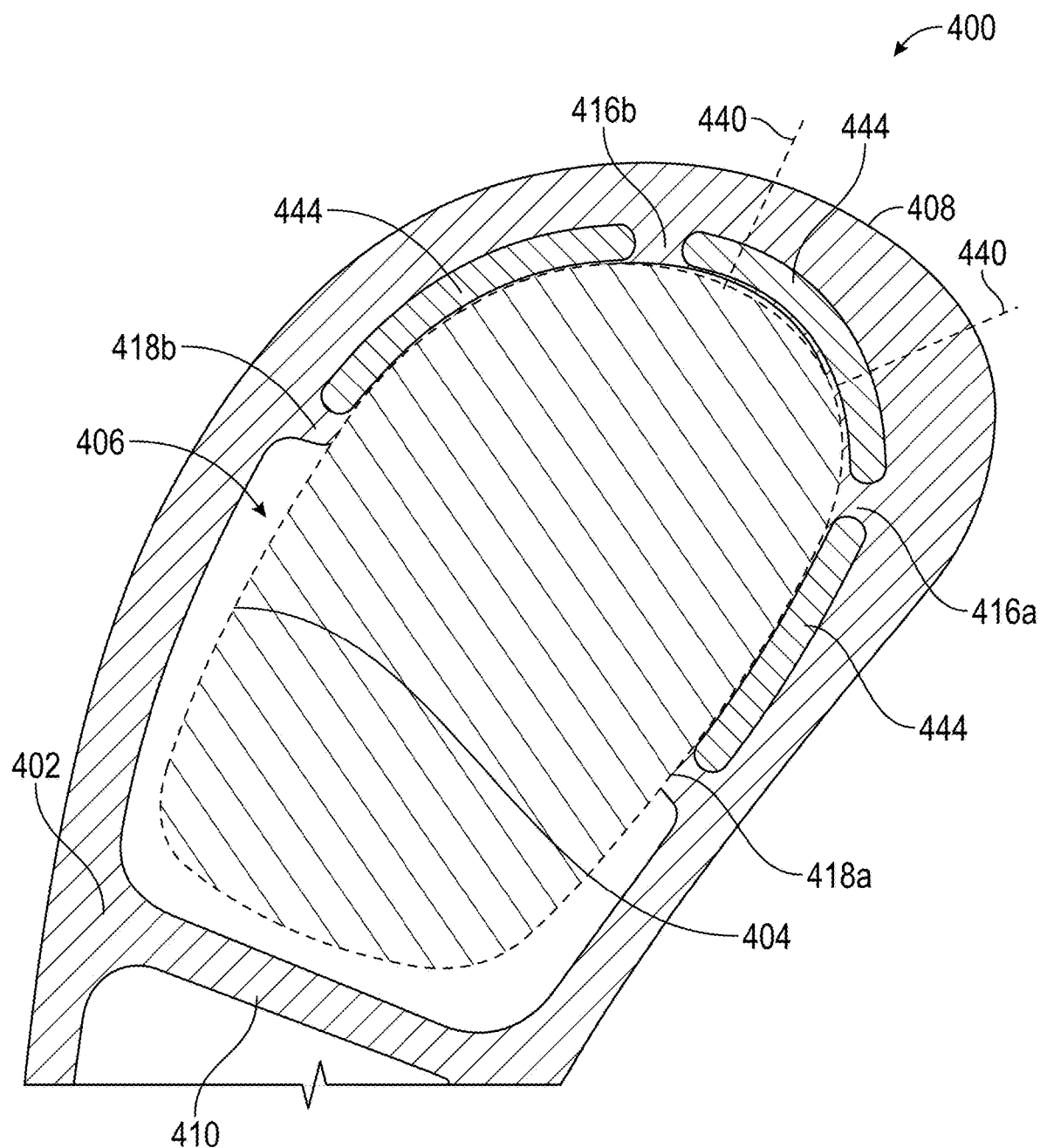
FIG. 4D is an enlarged illustration of features of the airfoil assembly of FIG. 4A.

Turning now to FIGS. 4A-4D, schematic illustrations of an airfoil assembly 400 in accordance with an embodiment of the present disclosure are shown. The airfoil assembly 400 includes an airfoil body 402 and a leading edge baffle 404 installed within a leading edge cavity 406 of the airfoil body 402. FIG. 4A is a cross-sectional view of the airfoil assembly 400, FIG. 4B is a side elevation view of the leading edge baffle 404, FIG. 4C is a schematic illustration of the interior structure of the airfoil body 402 of the airfoil assembly 400, and FIG. 4D is a schematic illustration of the interior structure of the airfoil body 402 within the leading edge cavity 406.

The leading edge baffle 404 is arranged within the leading edge cavity 406. The leading edge cavity 406 is an enlarged leading edge cavity. For example, and in accordance with some embodiments of the present disclosure and without limitation, an axial length of the leading edge cavity 406 may extend at least 20% of the axial distance of the airfoil between a leading edge and a trailing edge thereof. In some non-limiting configurations, the axial length of the leading edge cavity 406 may be between 20% and 70% of the axial length of the airfoil (from leading edge to trailing edge). This increased distance (e.g., as compared to prior configurations having a profile in the axial direction of less than 20%) allows for an improved cooling scheme of the airfoil, when combined with the other features described. The leading edge cavity 406 is sized to accommodate installation of the leading edge baffle 404 into the airfoil.

Such an enlarged leading edge cavity 406 increases the distance between a leading edge 408 of the airfoil body and an interior rib 410 of the airfoil body 402. The leading edge cavity 406 is defined at a forward end by the leading edge 408 and at an aft end by the interior rib 410. Sides of the leading edge cavity 406 are defined by a pressure side wall 412 and a suction side wall 414 of the airfoil body 402. Of the walls or surfaces that define the leading edge cavity 406, the leading edge 408, the pressure side wall 412, and the suction side wall 414 are "hot walls" that are exposed to hot gases or the hot gas path when in operation. The interior rib 410 is a "cold wall" that does not have surfaces that are directly exposed to hot gas during operation.

To position the leading edge baffle 404 within the leading edge cavity 406, the airfoil body 402 includes a number of radially extending standoff rails 416, 418 that extend inward from the respective walls of the leading edge cavity 406. As used herein, the term "radial" refers to a direction when installed within an engine, such that radial is into/out of the page in FIG. 4A and up/down in FIGS. 4B-4C. As shown, the airfoil body 402 includes two forward radially extending standoff rails 416a, 416b and two aft radially extending standoff rails 418a, 418b. A first forward radially extending standoff rail 416a and a first aft radially extending standoff rail 418a are arranged along the pressure side wall 412. A second forward radially extending standoff rail 416b and a second aft radially extending standoff rail 418b are arranged along the suction side wall 414.

When the leading edge baffle 404 is arranged within the leading edge cavity 406, the leading edge cavity 406 is divided into a number of sub-cavities and/or channels. For example, with reference to FIG. 4A, a feed cavity 420 is defined within the interior of the leading edge baffle 404. In some embodiments, the feed cavity 420 may be a through-flow cavity that extends between open ends at the inner and outer diameter ends of the leading edge baffle 406 (in a radial direction). In other embodiments, the inner diameter end of the leading edge baffle 404 may be capped such that the leading edge baffle 404 acts as a plenum to supply cooling air into various channels defined between the exterior surface of the leading edge baffle 404 and an interior surface of the airfoil body 402.

A showerhead radial channel 422 is defined between the interior surface of the leading edge cavity 404, an exterior surface of the leading edge baffle 404, and between the first and second forward radially extending standoff rails 416a, 416b. A pressure side radial flow channel 424 is defined between the pressure side wall 412, an exterior surface of the leading edge baffle 404, the first forward radially extending standoff rail 416a, and the first aft radially extending standoff rail 418a. A suction side radial flow channel 426 is defined between the suction side wall 414, an exterior surface of the leading edge baffle 404, the second forward radially extending standoff rail 416b, and the second aft radially extending standoff rail 418b. An aft channel 428 is defined aft of each of the first and second aft radially extending standoff rails 418a, 418b along the pressure and suction side walls 412, 414, the interior rib 410 of the airfoil body 402, and exterior surfaces of the leading edge baffle 404. The aft channel 428 may be a through-flow channel that is open at an inner diameter end to supply cooling air, for example, to an inner diameter platform or other downstream components or cavities of an engine structure.

FIG. 4B illustrates a side elevation view (pressure side) of the leading edge baffle 404. The leading edge baffle 404 extends radially between an outer diameter end 430 to an inner diameter end 432. In some embodiments, each of the outer diameter end 430 and the inner diameter end 432 may be open or unobstructed to allow airflow therethrough. In other embodiments, the leading edge baffle 404 may be capped at the inner diameter end 432 to form a plenum to supply cooling flow into the channels external to the leading edge baffle 404. As shown, the leading edge baffle 404 includes a number of feed apertures 434, 436, 438 located proximate an inlet end of the leading edge baffle 404 (in this case, the outer diameter end 430). The leading edge baffle 404 will be fed with cooling air from a platform or other source, as known in the art, and the cooling air will enter the feed cavity 420 and flow into the channels 422, 424, 426, 428 defined between the exterior of the leading edge baffle 404 and the interior surfaces of the airfoil body 402.

A leading edge feed aperture 434 is arranged on a leading edge end of the leading edge baffle 404 and is configured to supply cooling air into the showerhead radial channel 422. The flow through the leading edge feed aperture 434 will enter the showerhead radial channel 422, from the feed cavity 420, at the outer diameter thereof and then flow radially inward (downward) along the interior surface of the leading edge 408 of the airfoil body 402. The cooling flow will then exit through one or more showerhead apertures 440 which may expel cooling flow along the exterior of the leading edge 408 of the airfoil body 402 and provide film cooling thereto.

Each of the pressure side radial flow channel 424 and the suction side radial flow channel 426 may be fed with cooling flow through respective pressure and suction side feed aperture arrays 436 (pressure side shown in FIG. 4B with a similar array on the suction side). The cooling flow will enter the feed cavity 420 and pass through the side feed aperture arrays 436 to enter the respective channels 422, 424 and flow radially inward (toward the inner diameter end 432) to provide cooling to the forward portions of each of the pressure side wall 412 and the suction side wall 414 of the leading edge cavity 406.

The aft channel 428 may be supplied with cooling from through aft feed aperture arrays 438 (e.g., an array on each of the pressure and suction sides of the leading edge baffle 404). The cooling flow will enter the feed cavity 420 and pass through the aft feed aperture arrays 438 to enter the aft channel 428 and flow radially inward (toward the inner diameter end 432) to provide cooling to the aft portions of each of the pressure side wall 412 and the suction side wall 414 of the leading edge cavity 406.

Feed aperture arrays in accordance with embodiments of the present disclosure can be adjusted/tailored to optimize fill characteristics and impingement heat transfer. The feed aperture arrays may serve to distribute flow between channels as desired. For example, the total area of the feed array for the forward suction side channel may be greater than any other channel due to requiring a larger amount of flow to cool the forward suction side gas path surfaces of the airfoil. Flow splits between channels can allow for further optimization/adjustment if hot spots are noticed and flow can be spared from another channel to address such hot spots.

As shown in FIG. 4B, the leading edge baffle 404 has a substantially solid wall with no apertures or openings defined by a solid portion 442 that extends radially from a lower extent of the feed apertures 434, 436, 438 to the inner diameter end 432 of the leading edge baffle 404. The solid portion 442 of the leading edge baffle 404 provides for surface along which the cooling flow will pass and can pick up heat without significant disruption. In addition to providing a cooling channel of the desired size, less temperature increase may be realized in the cooling air when using a space-eater baffle in accordance with embodiments of the present disclosure. Traditional cooling channels have the air sandwiched between two alloy walls and thus pick up heat based on the temperature contribution on both the pressure side and suction side. However, in accordance with embodiments of the present disclosure, by using a space-eater baffle, the heat pickup may be reduced to half as the baffle wall temperature is essentially equal to the coolant temperature. This makes for more effective cooling in general as the heat transfer is directly related to the difference in temperature between the alloy wall and the coolant. The solid portion 442 may define, for example at least 75% of the radial height of the leading edge baffle 404. In other embodiments, the solid portion 442 may define about 50% of the radial height of the leading edge baffle 404. As such, it will be appreciated that the radial height of the solid portion may be selected based on specific cooling schemes and requirements for the particular airfoil and/or location within a gas turbine engine. It should be noted that leading edge baffle 404 may include flow apertures the may extend radially, either periodically, intermittently or in a pattern, from the outer diameter end 430 to the inner diameter end 432 to mitigate pressure loss and cooling air temperature heat pickup to address local back flow margin and/or achieve local thermal cooling effectiveness requirements to nonuniformities in the radial gas temperature profile.

The aft channel 428 may be substantially fluidly separate from the forward positioned side radial flow channels 424, 426. Such fluid separation may be provided by the aft radially extending standoff rails 418a, 418b, as shown in FIGS. 4A, 4C. Because the aft channels are fluidly separate from the forward channels, each section can be addressed individually to meet the cooling required for their respective heat loads without risk of unexpected cooling imbalance when one or the other is adjusted. In some embodiments, the aft radially extending standoff rails 418a, 418b may be solid from a position proximate the outer diameter end 430 to a position proximate the inner diameter end 432 when viewed relative to the leading edge baffle 404. In some embodiments, however, one or more cross-over holes may be arranged in the aft radially extending standoff rails 418a, 418b to permit some amount of fluid communication between the side radial flow channels 424, 426 and the aft channel 428.

The aft radially extending standoff rails 418a, 418b and the forward radially extending standoff rails 416a, 416b define the side radial flow channels 424, 426 therebetween. However, unlike the aft radially extending standoff rails 418a, 418b, the forward radially extending standoff rails 416a, 416b are defined as interrupted or segmented rails. The segmented nature of the forward radially extending standoff rails 416a, 416b permits cooling from within the side radial flow channels 424, 426 to flow into the showerhead radial channel 422. Such flow may be a resupply flow that provides cooling flow to radial inward portions of the showerhead radial channel 422 along the leading edge 408 of the airfoil body 402, as needed. In other configurations, the flow aperture openings may be tailored to redistribute flow may be customized as needed to optimize allotted cooling flow to achieve desired local thermal cooling performance. For example, more flow can be distributed near the outer diameter, if needed, or most of the flow may be kept within the channel and combined at the inner diameter, or combinations thereof.

The flow apertures created between the leading edge baffle 404 and the forward radially extending standoff rails 416a, 416b may be varied in both size and shape. The resulting flow geometry of the apertures may be defined by a flat edge formed by an exterior surface of the leading edge baffle 404 and a filleted blend surface that is formed by the radially extending interrupted or segmented forward radially extending standoff rails 416a, 416b. The aspect ratio of the formed apertures may range between 1:1≥W/H≥10:1, depending on flow and pressure loss requirements. The flow aperture geometry may approximate a circle, an oblong, and/or an elliptical shape/geometry, recognizing that the one side of the aperture created by the leading edge baffle 404 will generally be planar or have a slight amount of curvature depending on the local airfoil and baffle radius curvature. It is noted that axial flow apertures may be provided to generate local convective heat transfer immediately adjacent to the hot wall. Subsequent to the radially distributed flow apertures in the segmented standoff rails 416a, 416b, trip strip or other similar features may be incorporated into or on surfaces of the showerhead radial channel 422 to further enhance the local convective heat transfer and improve local thermal cooling performance. It is also noted that while the current illustrations show apertures in in the segmented standoff rails 416a, 416b, it will be appreciated that the segmented apertures can be offset from the hot wall to simulate more of an impingement rib-type of effect.

The leading edge baffle 404 is positioned and retained within the leading edge cavity 406 by the radially extending standoff rails 416, 418 and an inner diameter forward collar 444. The inner diameter forward collar 444 is a structural feature of the airfoil body 402. The inner diameter forward collar 444 extends from an inner diameter end of each of the aft radially extending standoff rails 418a, 418b in a forward direction toward the leading edge 408 of the airfoil body 402, as shown in FIGS. 4C-4D. As shown, the inner diameter forward collar 444 may provide for an inner diameter wall or blockage, which prevents throughflow of the cooling air through the side radial flow channels 424, 426 and/or the showerhead radial channel 422. This results in the air within such channels 422, 424, 426, 428 to be expelled through the showerhead apertures 440 and keeps this portion of the airfoil fluidly separate from the inner diameter platform and aft leading edge regions. In some embodiments, the leading edge baffle 404 may rest, at least partially, upon the inner diameter forward collar 444.

Although not illustrated, a similar collar may also be incorporated at the outer diameter end 430 of the airfoil assembly 400. The utilization of a collar at the outer diameter end 430 of the airfoil assembly 400 may be twofold. For example, such an outer diameter collar may allow for circumferential positioning of the leading edge baffle 404. Additionally, such an outer diameter collar may provide support to mitigate potential deflection of the leading edge baffle 404 during manufacturing and/or assembly. Further, for example, the incorporation of an outer diameter collar may mitigate potential bulging of the baffle walls that may occur during engine operation due to a pressure gradient that exist between the inner baffle cavity 420 and the baffle gap channels 422, 424, 426, 428.

As such, the incorporation of collars may mitigate baffle deformation during assembly and/or during engine operation. Further, one or more discrete standoff features may be provided to maintain a design intent radial baffle gap height and channel flow area to achieve desired pressure loss and heat transfer characteristics and achieve thermal cooling performance requirements. The discrete standoff features may either be cast features and/or integrated into the leading edge baffle 404 design coincident with predicted baffle deformation locations at determined radial and/or circumferential locations.

Such outer diameter collar may be a continuous feature (e.g., solid) or may be perforated (e.g., apertures, holes, openings, or otherwise discontinuous) with at least one flow aperture to provide additional cooling flow to the radial baffle gap channels 422, 424, 426, 428. The outer diameter collar may be flush with the outer diameter end 430 of the airfoil assembly 400 or may extend radially outward beyond the outer diameter end 430. As such, at least one flow aperture within the outer diameter collar may be oriented either horizontally or radially to serve as conduit for outer diameter platform cooling flow to improve backside platform convective heat transfer characteristics.

As noted above, such an outer diameter collar may also contain at least one radial oriented aperture to further increase a cooling flow rate in the radial baffle gap channels 422, 424, 426, 428, to increase local backside convective cooling and/or increase radial baffle gap channel pressures for incorporation of film cooling if required. Additionally, an outer diameter baffle flange may be integrated with the leading edge baffle 404 to provide similar positioning (e.g., circumferential positioning) and allowance for at least one cooling flow aperture to optimize and tailor internal radial baffle gap cooling flow and pressure distribution within the channels 422, 424, 426, 428.

As shown in FIG. 4C, the interior surface of the airfoil body 402 may include heat transfer augmentation features 446 distributed along surfaces of the channels 422, 424, 426, 428. The heat transfer augmentation features 446 may be trip strips, chevron strips, pedestals, pin fins, hemispherical bumps, delta fins, or other internal surface features that are configured to control and/or direct flow to ensure cooling of the material of the airfoil body 402.

The airfoil assembly 400 includes the aft radially extending standoff rails 418a, 418b that segregates the aft channel 428 from the side radial flow channels 424, 426 in a way that optimizes heat transfer. Further, the segmented forward radially extending standoff rails 416a, 416b enable bleed flow from the side radial flow channels 424, 426 to the showerhead radial channel 422 to feed cooling holes (e.g., showerhead apertures 440).

In some embodiments, the airfoil assembly 400 may be arranged as a second stage vane within a turbine or compressor section of a gas turbine engine. The second stage vane may require unique cooling solutions due to the downstream position relative to a first stage vane. As noted above, this is due to the fact that the first stage vane heat loads are greater and thus the first stage vane receives a much larger amount of the available cooling air. Similarly, blade cooling allotments are higher as they are rotating as such additional considerations associated with airfoil creep and thermal mechanical fatigue must be addressed. However, in accordance with embodiments of the present disclosure, less flow may be used efficiently in downstream (e.g., second stage or aft positioned vanes) in order to achieve life metrics. Because of this, the use of the described leading edge baffle can optimize the cooling of the leading edge of the second stage vane and thus improve part life and operational temperatures.

Figure 5:
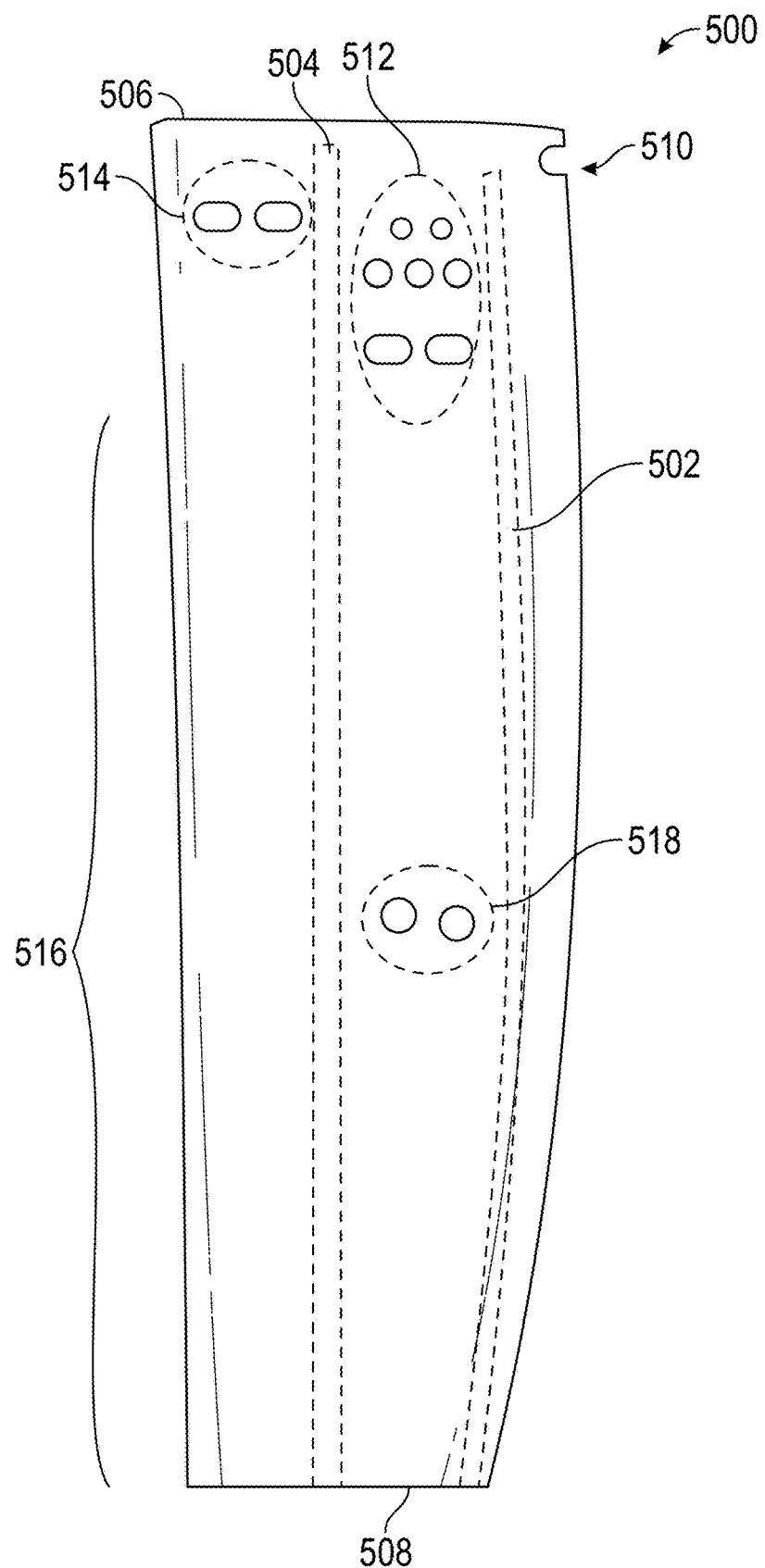
FIG. 5 is a schematic illustration of a baffle in accordance with an embodiment of the present disclosure.

Turning now to FIG. 5, a schematic illustration of a leading edge baffle 500 in accordance with an embodiment of the present disclosure is shown. The leading edge baffle 500 may be installed within a leading edge cavity of an airfoil body (not shown), similar to that shown and described above with respect to FIGS. 4A-4D. The leading edge baffle 500 may be configured to be positioned with such leading edge cavity of the airfoil and retained therein by one or more radial standoff rails. For example, as shown in phantom lines, a forward rail 502 and an aft rail 504 are shown relative to the leading edge baffle 500. The forward rail 502 may be a segmented rail similar to the forward radially extending rails 416a, 416b and the aft rail 504 may be solid rail similar to the aft radially extending rails 418a, 418b.

Similar to the leading edge baffle 404 described above, the leading edge baffle 500 extends in a radial direction between an outer diameter end 506 and an inner diameter end 508. The leading edge baffle 500 may have an opening or open end at the outer diameter end 506 and may be closed, capped, or otherwise sealed at the inner diameter end 508. Proximate the outer diameter end 506 of the leading edge baffle 500 are a leading edge feed aperture 510, side feed aperture arrays 512, and aft feed aperture arrays 514, similar to that described above.

Radially inward from the feed apertures 510, 512, 514, the leading edge baffle 500 includes a solid portion 516. However, in this embodiment, the solid portion 516 includes resupply apertures 518 arranged between the lowest extent (in the radial direction) of the feed apertures 510, 512, 514 and the inner diameter end 508 of the leading edge baffle 500. In this embodiment, the resupply apertures 518 are arranged on the portion of the leading edge baffle 500 that defines the side radial flow channels (i.e., not the aft channel nor the showerhead radial channel) and illustrated between the forward rail 502 and an aft rail 504 when installed within an airfoil. The resupply apertures 518 may be provided to target area(s) of low static pressure, high heat loads, and/or to increase fill and general cooling within the radial channels.

Figure 6:
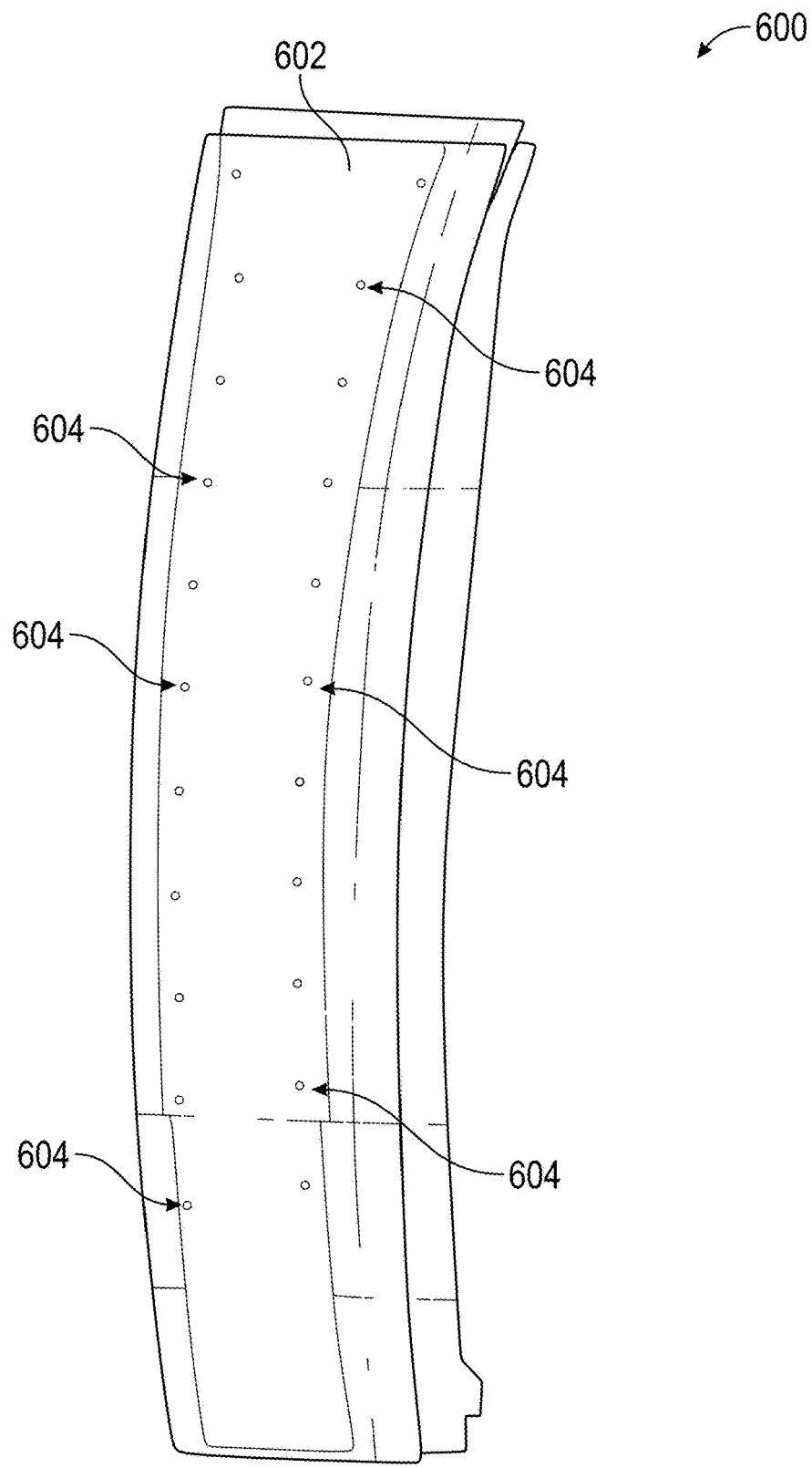
FIG. 6 is a schematic illustration of baffle in accordance with an embodiment of the present disclosure.

Turning now to FIG. 6, a schematic illustration of a leading edge baffle 600 in accordance with an embodiment of the present disclosure is shown. The leading edge baffle 600 may be substantially similar to that shown and described above. The view of FIG. 6 is a forward facing view of an aft wall 602 of the leading edge baffle 600. The aft wall 602 of the leading edge baffle 600 is configured to face an internal rib of an airfoil in which the leading edge baffle 600 is installed (e.g., interior rib 410 of the airfoil body 402 shown in FIG. 4A). The leading edge baffle 600 includes one or more trailing edge impingement apertures 604 formed in the aft wall 602. These apertures 604 can also take the form of various slot configurations along each respective row. Additionally, the apertures are not limited to two discrete and/or equal rows as shown, but rather variations or unequal distributions may be employed.

Further, for example, the apertures could be placed down the center of the baffle, or in other arrays, with the aperture area adjusted as needed to create a fluidic wall as desired. The trailing edge impingement apertures 604 are configured to impinge cooling flow from the interior of the leading edge baffle 600 toward an interior rib of the airfoil body. The impinging flow can prevent cross-flow or flow migration between the pressure and suction sides of the aft channel.

As discussed above, the described leading edge baffles may be positioned within a leading edge cavity and supported, at least in part, by the radial rails and/or collar. In some embodiments, the leading edge baffles may rely on cast-in standoffs (e.g., radial rails) mating up with the sheet metal in operation in order to create segregated channels and control flow fields, as described above. When installed/assembled, there must be a gap left between the standoff rails and the exterior surface of the leading edge baffle such that insertion of the baffle is possible within the leading edge cavity. The gap can increase if there is significant curvature in the airfoil, leading to scenarios where the cold-state finished assembly has larger than desired gaps between the exterior baffle surfaces and stand-off rails. In operation, some amount of baffle bulge is expected, though it is difficult to predict the amount of bulge for any given operating point, thus the smaller the gaps in the areas requiring high heat transfer in the cold-state the better.

To accommodate such considerations the leading edge baffles of the present disclosure may include a "negative" bump-in, depression, groove, recess, etc. (hereinafter referred to as a "standoff shelf") at locations that will mate or align with the radial rails/standoffs. By including such standoff shelves, the sheet metal baffle around the radial rails can allow the material surfaces of the baffle defining the radial channels to sit closer (in the cold-state) to the interior surface of the airfoil body walls (e.g., leading edge, pressure side wall, suction side wall) than it otherwise would have without such standoff shelves. The standoff shelves may run the entire (radial) length of the respective radial rail to which the standoff shelf may engage. Such standoff shelves may increase the confidence that the channel heights used in analysis are not disrupted due to gapping required at the radial rails. Gaps around the radial rails can be minimized, but with these features, there would be no collateral damage done to the height of the heat transfer channels defined between the exterior of the leading edge baffle and the interior surfaces of the airfoil body.

Figure 7A:
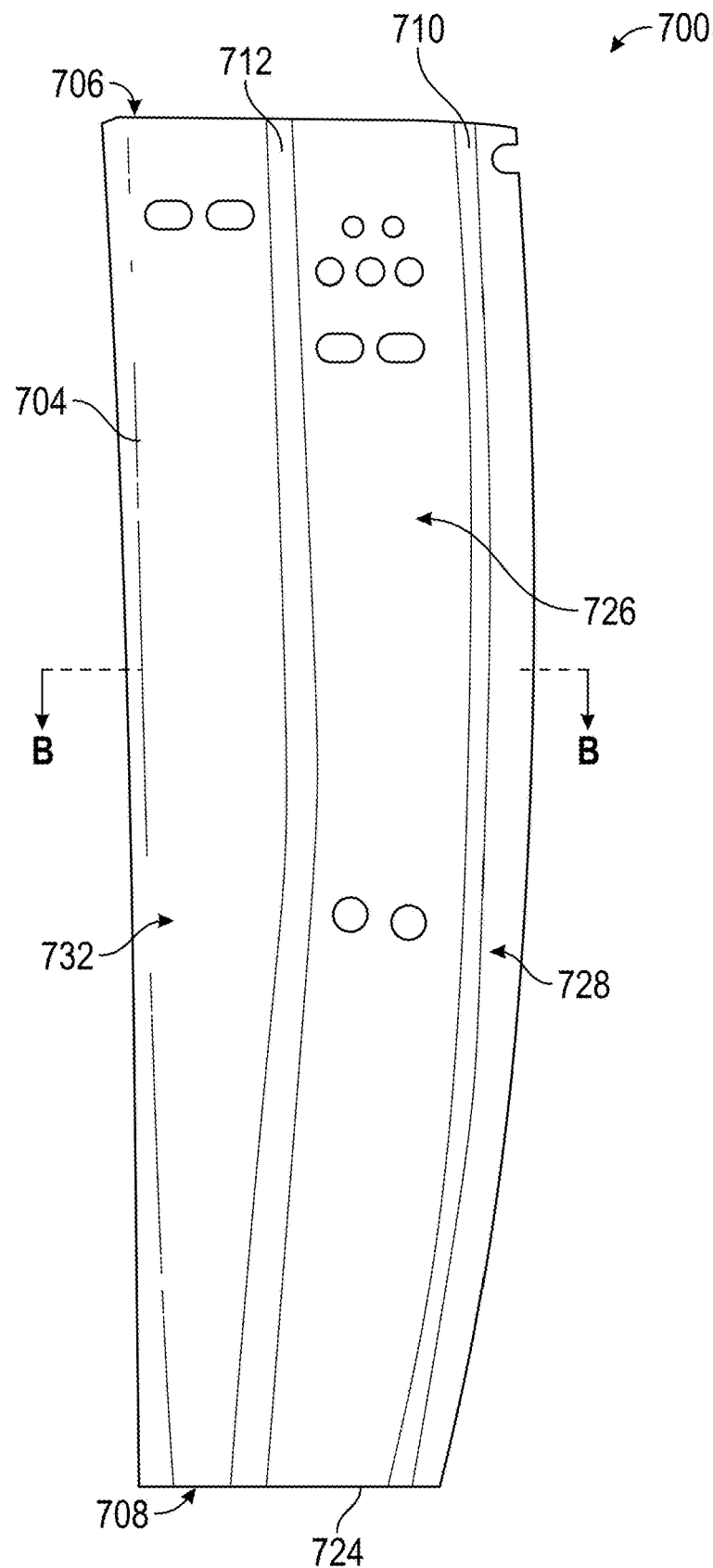
FIG. 7A is a schematic illustration of a baffle in accordance with some embodiments of the present disclosure.
Figure 7B:
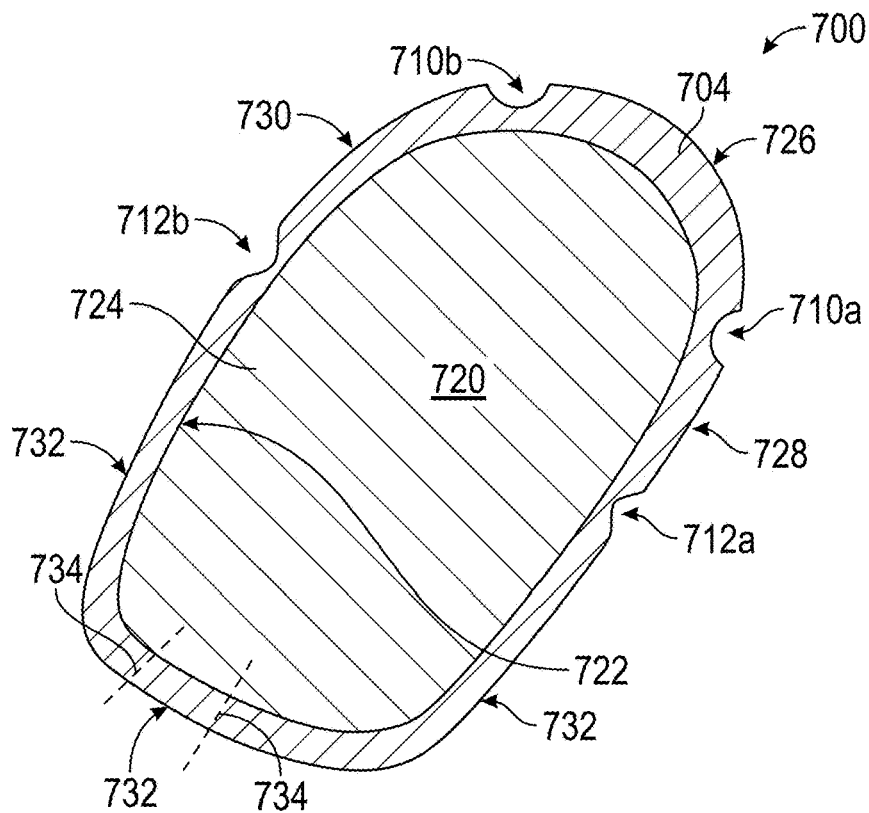
FIG. 7B is a cross-sectional view of the baffle of FIG. 7B.
Figure 7C:
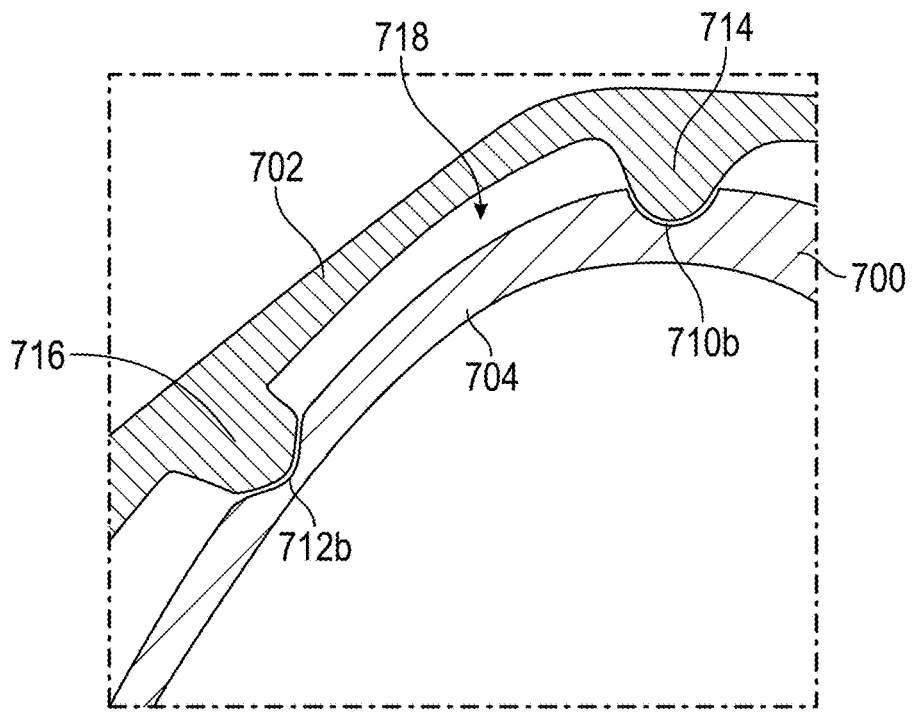
FIG. 7C is an enlarged schematic illustration of the baffle of FIG. 7A as installed within an airfoil body.

Turning now to FIGS. 7A-7C, schematic illustrations of a leading edge baffle 700 in accordance with an embodiment of the present disclosure are shown. FIG. 7A is a pressure side elevation view of the leading edge baffle 700, FIG. 7B is a cross-sectional view looking radially inward at the line B-B shown in FIG. 7A, and FIG. 7C is an enlarged detailed view of the leading edge baffle 700 as installed within an airfoil body 702. The leading edge baffle 700 may be substantially similar to that shown and described above, being configured to be installed within a leading edge cavity of an airfoil and define multiple radial flow channels between the exterior of the leading edge baffle 700 and the interior surfaces of the leading edge cavity.

As shown in FIG. 7A, the leading edge baffle 700 includes a baffle body 704 that extends radially between an outer diameter end 706 and an inner diameter end 708. On the exterior surface of the leading edge baffle 700, a number of standoff shelves 710, 712 are formed within the material of the leading edge baffle 700. Forward standoff shelves 710 (710a, 710b shown in FIG. 7B) are arranged at a forward end of the leading edge baffle 700 and are configured to engage with forward radially extending rails of an airfoil body (e.g., forward radially extending rails 416a, 416b). Aft standoff shelves 712 (712a, 712b shown in FIG. 7B) are arranged aft of the forward standoff shelves 710 and are configured to engage with aft radially extending rails (e.g., aft radially extending rails 418a, 418b). The standoff shelves 710, 712 extend the full radial length of the leading edge baffle 700 (i.e., from the outer diameter end 706 to the inner diameter end 708) and define channels or slots that are shaped to engage with rails of an airfoil body (e.g., as shown in FIG. 7C). The standoff shelves 710, 712 are depressions, grooves, channels or the like that are defined as reduced material thickness of the material of the baffle body 704.

FIG. 7C illustrates an enlarged view of the leading edge baffle 700 as installed within an airfoil body 702. In this illustration, the airfoil body 702 includes a forward radially extending rail 714 and an aft radially extending rail 716. Defined between an interior surface of the airfoil body 702 and an exterior surface of the baffle body 704 and bounded at a forward end by the forward radially extending rail 714 and at an aft end by the aft radially extending rail 716 is a radial extending channel 718. By including such standoff shelves on the exterior surface of the baffle body 704, the height (distance from exterior surface of baffle body 704 to interior surface of airfoil body 702) may be tailored to desired cross-sectional area. Further, such standoff shelves 710, 712 can provide for a relatively sealed engagement between the baffle body 704 and the airfoil body 702 at the rails 714, 716. As such, bleed across the engagement region can be minimized or eliminated by providing a more consistent engagement between the baffle body 704 and the rails 714, 716.

As shown in FIGS. 7A-7B, the leading edge baffle 700 defines an inner plenum 720 for receiving cooling air, such as from an outer diameter platform, for example. The inner plenum 720 is defined by an inner surface 722 of the baffle body 704, with an open top end (e.g., at the outer diameter end 706) and a closed or solid bottom end (e.g., at the inner diameter end 708), closed by a cap 724. On the exterior of the baffle body 704, the standoff shelves 710, 712 define different external surfaces of the baffle body 704 therebetween. For example, as shown, a showerhead channel surface 726 is defined along a forward end of the baffle body 704 between a pressure side forward standoff shelf 710*a* and a suction side forward standoff shelf 710*b*. The standoff shelves 710, 712 are illustratively shown as reduced material thickness portions of the baffle body 704. In other embodiments, such as when the material thickness of the baffle body 704 does not enable carving out material, the standoff shelves 710, 712 may be formed of a bend or curve in the material of the baffle body, such as a bend or curve of sheet metal.

A pressure side channel surface 728 is defined on a pressure side of the baffle body 704 between the pressure side forward standoff shelf 710*a* at a forward end and a pressure side aft standoff shelf 712*a* at an aft end of the pressure side channel surface 728. A suction side channel surface 730 is defined on a suction side of the baffle body 704 between the suction side forward standoff shelf 710*b* at a forward end and a suction side aft standoff shelf 712*b* at an aft end of the suction side channel surface 729. An aft channel surface 732 is defined about the aft exterior surface of the baffle body 704 between the pressure side aft standoff shelf 712*a* and the suction side aft standoff shelf 712*b*. One or more trailing edge impingement apertures 734 may be formed through the aft channel surface 732 of the baffle body 704, as described above.

Figure 8:
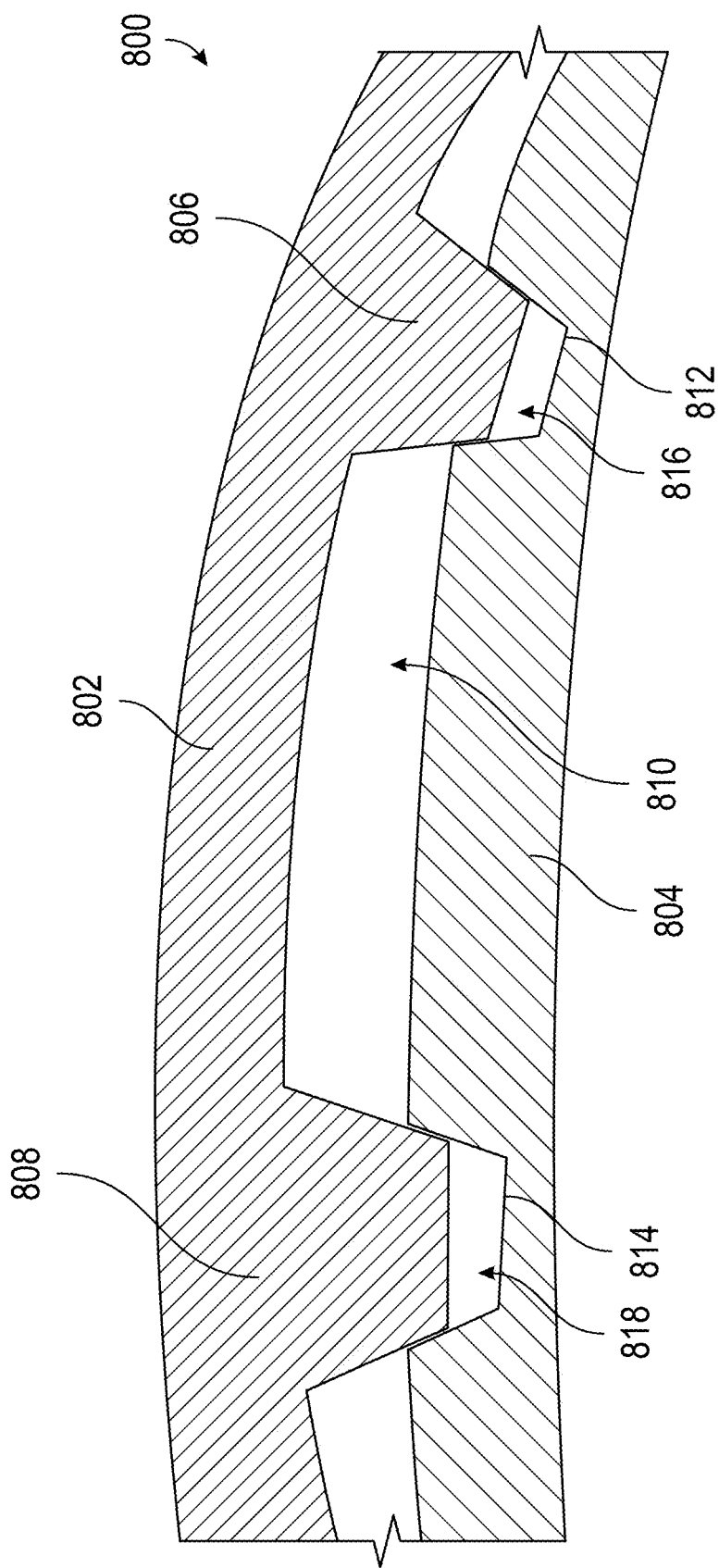
FIG. 8 is a schematic illustration of a baffle and airfoil body in accordance with an embodiment of the present disclosure.

Turning now to FIG. 8, a schematic illustration of a portion of an airfoil assembly 800 in accordance with an embodiment of the present disclosure is shown. The airfoil assembly 800 includes an airfoil having an airfoil body 802 and a leading edge baffle having a baffle body 804. The airfoil assembly 800 may be similar to that shown and described above. The airfoil body 802 includes a forward radially extending rail 806 and an aft radially extending rail 808 that are arranged to define at least a radially extending channel 810 with a portion of the baffle body 804. The baffle body 804 includes a forward standoff shelf 812 and an aft standoff shelf 814 that are configured to engage with the forward radially extending rail 806 and an aft radially extending rail 808, respectively. As described above, the standoff shelves 812, 814 are recesses or channels formed in the material of the baffle body 804. In this embodiment, the size and shape of the standoff shelves 812, 814 are selected to form standoff gaps 816, 818 between the surfaces of the standoff shelves 812, 814 and the rails 806, 808. The standoff gaps 816, 818 may be radial span gaps that extend from an outer diameter end to an inner diameter end of the baffle body 804 and thus provide through-channels from the outer diameter to the inner diameter. Cooling flow may be passed through the standoff gaps 816, 818, thus providing a pressured flow that will prevent bleed from one radial extending channel to an adjacent radially extending channel (e.g., as shown and described above) across the rails 806, 808.

Figure 9A:
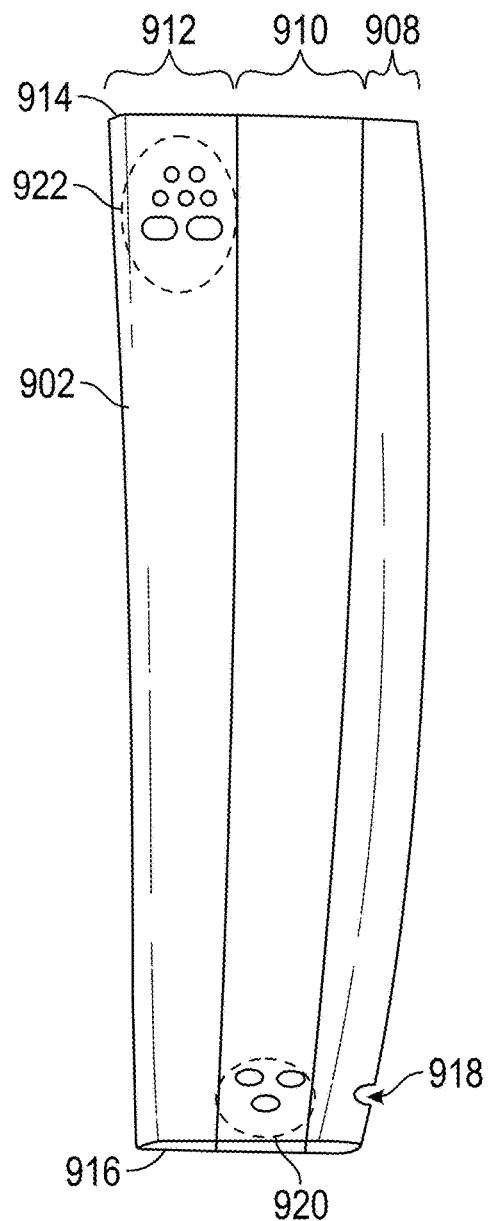
FIG. 9A is a side elevation view of a baffle in accordance with an embodiment of the present disclosure.
Figure 9B:
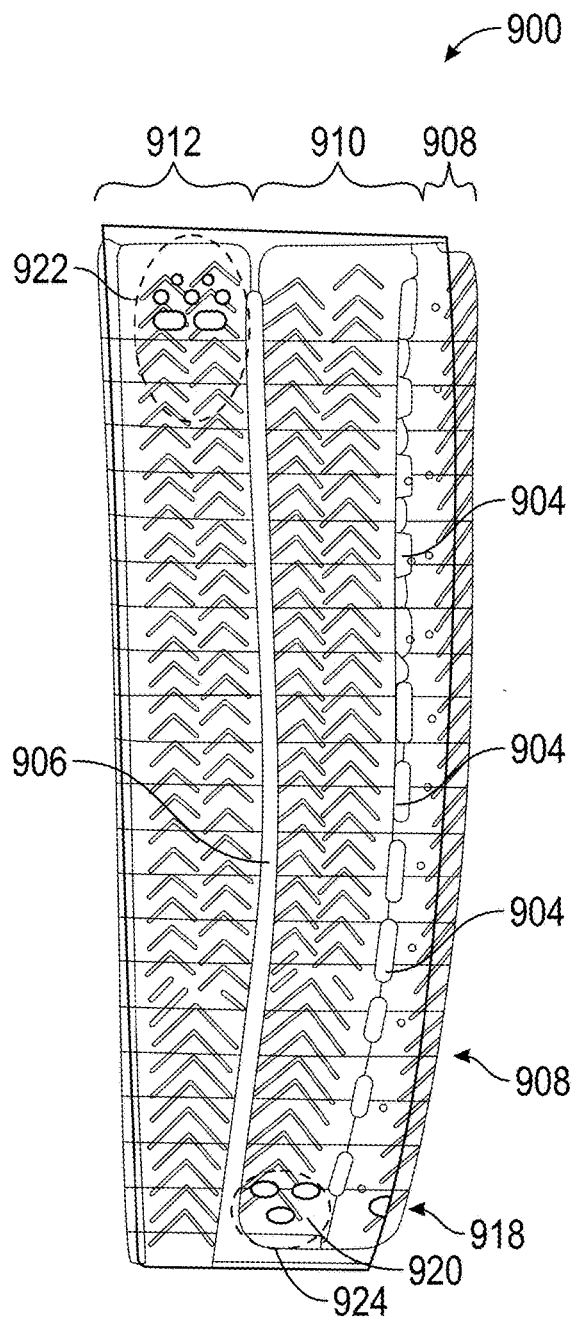
FIG. 9B is a side elevation view of the structure of an airfoil having the baffle of FIG. 9A installed therein.

Turning now to FIGS. 9A-9B, schematic illustrations of an airfoil assembly 900 in accordance with an embodiment of the present disclosure are shown. The airfoil assembly 900 includes an airfoil body and a leading edge baffle 902 installed within a leading edge cavity of the airfoil body, similar to that shown in FIGS. 4A-4D. However, in this embodiment, some of the feed apertures are arranged at an inner diameter end of the baffle, thus resulting in some cooling flow that flows from the inner diameter end toward the outer diameter end.

The leading edge baffle 902 is arranged within the leading edge cavity. Similar to the above described embodiments, to position the leading edge baffle 902 within the leading edge cavity, the airfoil body includes a number of radially extending rails 904, 906 that extend inward from the respective walls of the leading edge cavity. Although FIGS. 9A-9B illustrate a pressure side of the airfoil assembly 900, it will be appreciated that the suction side may include similar features, such as shown and described above. Accordingly, a forward radially extending rail 904 and an aft radially extending rail 906 are arranged along the pressure side wall, with similar structure present on the suction side wall.

When the leading edge baffle 902 is arranged within the leading edge cavity, the leading edge cavity is divided into a number of sub-cavities and/or channels. For example, a feed cavity is defined within the interior of the leading edge baffle 902. A showerhead radial channel 908 is defined between the interior surface of a leading edge 908 of the airfoil body, an exterior surface of the leading edge baffle 902, and between the forward radially extending rails 904. A pressure side radial flow channel 910 is defined between the pressure side wall, an exterior surface of the leading edge baffle 902, the forward radially extending rail 904, and the aft radially extending rail 906. An aft channel 912 is defined aft of each of the aft radially extending rails 906 along the pressure and suction side walls, an interior rib of the airfoil body, and exterior surfaces of the leading edge baffle 902. The aft channel 912 may be a through-flow channel that is open at an inner diameter end to supply cooling air, for example, to an inner diameter platform or other downstream components or cavities of an engine structure.

FIG. 9B illustrates a side elevation view (pressure side) of the leading edge baffle 902. The leading edge baffle 902 extends radially between the outer diameter end 914 to an inner diameter end 916. In some embodiments, each of the outer diameter end 914 and the inner diameter end 916 may be open or unobstructed to allow airflow therethrough. In other embodiments, the leading edge baffle 902 may be capped at the inner diameter end 916 to form a plenum to supply cooling flow into the channels external to the leading edge baffle 902. As shown, the leading edge baffle 902 includes a number of feed apertures 918, 920, 922. The leading edge baffle 902 will be fed with cooling air from a platform or other source, as known in the art, and the cooling air will enter the feed cavity of the baffle and flow into the channels 908, 910, 912 defined between the exterior of the leading edge baffle 902 and the interior surfaces of the airfoil body.

A leading edge feed aperture 918 is arranged on a leading edge end of the leading edge baffle 902 and is configured to supply cooling air into the showerhead radial channel 908. The flow through the leading edge feed aperture 918 will enter the showerhead radial channel 908, from the feed cavity, at the inner diameter thereof and then flow radially outward (upward, toward the outer diameter end 914) along the interior surface of the leading edge 908 of the airfoil body. The cooling flow will then exit through one or more showerhead apertures which may expel cooling flow along the exterior of the leading edge 908 of the airfoil body and provide film cooling thereto.

The pressure side radial flow channel 910 may be fed with cooling flow through a pressure side feed aperture arrays 920, with the suction side having a similar configuration. The cooling flow will enter the feed cavity and pass through the side feed aperture arrays 920 to enter the respective channels 908, 910 and flow radially outward (toward the outer diameter end 914) to provide cooling to the forward portions of each of the side walls of the leading edge cavity.

The aft channel 912 may be supplied with cooling from through aft feed aperture arrays 922 (e.g., an array on each of the pressure and suction sides of the leading edge baffle 902). The cooling flow will enter the feed cavity and pass through the aft feed aperture arrays 922 to enter the aft channel 912 and flow radially inward (toward the inner diameter end 916) to provide cooling to the aft portions of each of the pressure side wall and the suction side wall of the leading edge cavity. Feed aperture arrays in accordance with embodiments of the present disclosure can be adjusted/tailored to optimize fill characteristics and impingement heat transfer. The feed aperture arrays may serve to distribute flow between channels as desired. For example, the total area of the feed array for the forward suction side channel may be greater than any other channel due to requiring a larger amount of flow to cool the forward suction side gas path surfaces of the airfoil. Flow splits between channels can allow for further optimization/adjustment if hot spots are noticed and flow can be spared from another channel to address such hot spots.

The aft channel 912 may be substantially fluidly separate from the forward positioned side radial flow channels 910. Such fluid separation may be provided by the aft radially extending rails 906. Because the aft channels are fluidly separate from the forward channels, each section can be addressed individually to meet the cooling required for their respective heat loads without risk of unexpected cooling imbalance when one or the other is adjusted. In some embodiments, the aft radially extending rails 906 may be solid from a position proximate the outer diameter end 914 to a position proximate the inner diameter end 916 when viewed relative to the leading edge baffle 902. In some embodiments, however, one or more cross-over holes may be arranged in the aft radially extending rails 906 to permit some amount of fluid communication between the side radial flow channels 910 and the aft channel 912.

The leading edge baffle 902 is positioned and retained within the leading edge cavity by the radially extending rails 904, 906 and an inner diameter forward collar 924. The inner diameter forward collar 924 is a structural feature of the airfoil body, as described above. The inner diameter forward collar 924 extends from an inner diameter end of each of the aft radially extending rails 906 in a forward direction toward the leading edge 908 of the airfoil body, as shown in FIG. 9B. As shown, the inner diameter forward collar 924 may provide for an inner diameter wall or blockage, which prevents throughflow through the side radial flow channels 910 and/or the showerhead radial channel 908. This results in the air within such channels 908, 910 to be expelled through the showerhead apertures and keeps this portion of the airfoil fluidly separate from the inner diameter platform and aft leading edge regions. In some embodiments, the leading edge baffle 902 may rest, at least partially, upon the inner diameter forward collar 924.

As noted above, the feed apertures 918, 920 are arranged at an inner diameter end of the leading edge baffle 902. In such a configuration, cooling flow may enter an internal feed cavity of the leading edge baffle 902 at the outer diameter end 914, then enter the channels 908, 910 at the inner diameter end and the flow may then flow radially outward toward the outer diameter end 914 of the leading edge baffle 902. The aft channel 912, as in the other embodiments, may remain a radially inward flowing channel. The outward flow in the forward channels 910, 908 may be augmented by heat transfer augmentation features and then expelled through one or more showerhead apertures formed in the leading edge 908 of the airfoil body. In some such embodiments, the channels 908, 910 may be capped at an outer diameter end thereof or otherwise blocked (e.g., by a portion of a platform) such that the flow therein flows out through showerhead apertures or other apertures formed at the leading edge portions of the airfoil body to expel cooling flow to an exterior of the airfoil body.

Figure 10A:
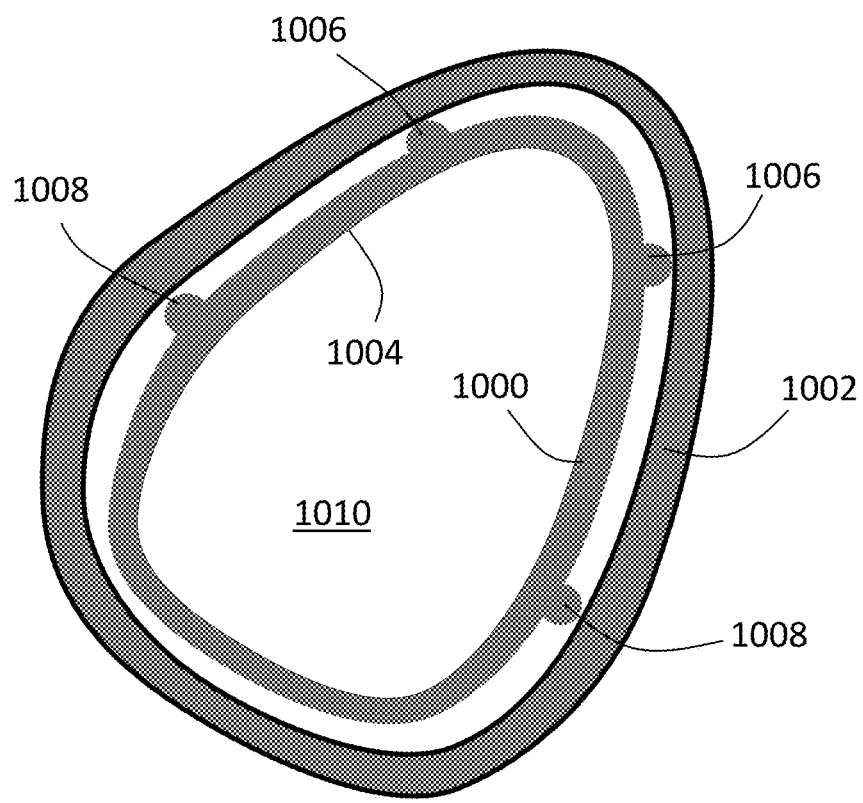
FIG. 10A is a schematic illustration of a baffle installed in an airfoil in accordance with an embodiment of the present disclosure.
Figure 10B:
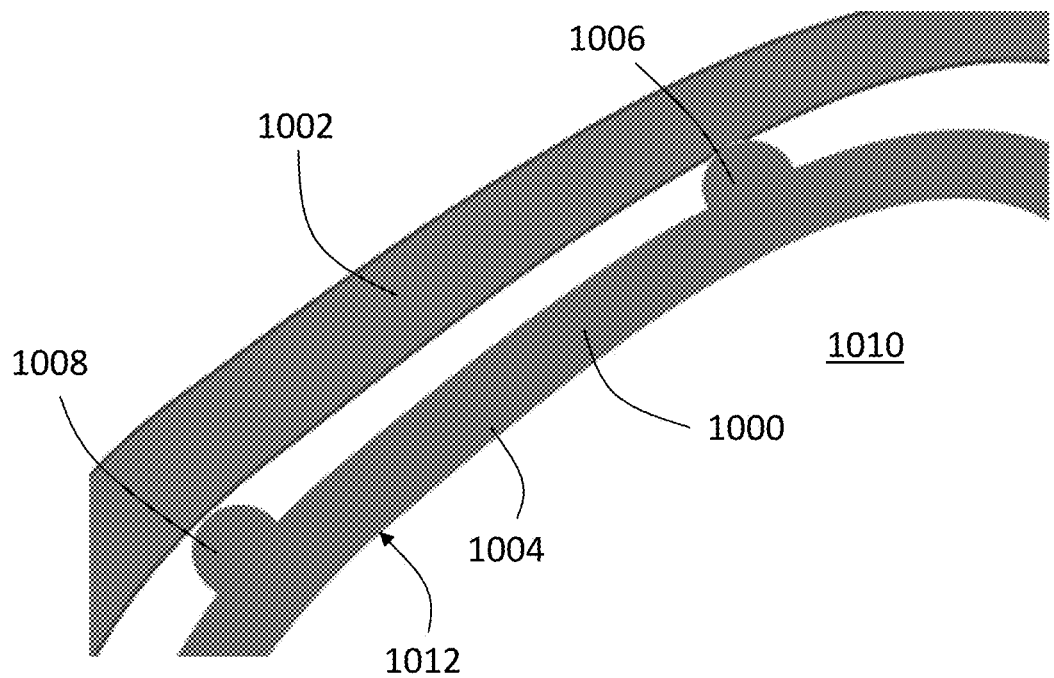
FIG. 10B is an enlarged illustration of the configuration of FIG. 10A.

Turning now to FIGS. 10A-10B, schematic illustrations of a leading edge baffle 1000 in accordance with an embodiment of the present disclosure are shown. FIG. 10A is a cross-sectional view looking radially inward as installed in an airfoil 1002, and FIG. 10B is an enlarged detailed view thereof. The leading edge baffle 1000 may be substantially similar to that shown and described above, being configured to be installed within a leading edge cavity of an airfoil and define multiple radial flow channels between the exterior of the leading edge baffle 1000 and the interior surfaces of the leading edge cavity of the airfoil 1002.

As shown in FIGS. 10A-10B, the leading edge baffle 1000 includes a baffle body 1004 that extends radially between an outer diameter end and an inner diameter end. On the exterior surface of the leading edge baffle 1000, a number of radially extending rails 1006, 1008 are formed on or with the material of the leading edge baffle 1000. Forward radially extending rails 1006 are arranged at a forward end of the leading edge baffle 1000 and are configured to engage with the interior surface of the airfoil 1002, which may optionally include shelves, grooves, slots, recesses, channels, or the like, such as shown in reverse in FIGS. 7B-7C. Similarly, aft radially extending rails 1008 are arranged aft of the forward radially extending rails 1006 and are configured to engage with the interior surface of the airfoil 1002. If the airfoil 1002 includes receiving features, such features may be formed as depressions, grooves, channels or the like that are defined as reduced material thickness of the material of the airfoil 1002 along the hot walls.

As shown in FIGS. 10A-10B, the leading edge baffle 1000 defines an inner plenum 1010 for receiving cooling air, such as from an outer diameter platform, for example. The inner plenum 1010 is defined by an inner surface 1012 with an open end (e.g., at the outer diameter end) and a closed or solid opposite end (e.g., at the inner diameter end), which may be closed by a cap or the like. On the exterior of the leading edge baffle 1000, the radially extending rails 1006, 1008 extend outward therefrom to engage with the inner surface of the airfoil 1002. The leading edge baffle 1000 may include a showerhead channel surface defined along a forward end of the leading edge baffle 1000, similar to that described above. Similarly, pressure and suction side channel surface may be defined on respective pressure and suction sides of the leading edge baffle 1000, as described above. An aft channel surface may be defined about the aft exterior surface of the leading edge baffle 1000. The leading edge baffle 1000 may include shower head apertures, impingement apertures, or the like, distributed or arranged about the leading edge baffle 1000 to provide cooling flow and other functions, as described above.

Although illustrated herein with substantially linear standoff rails and associated features (whether on the airfoil body or the baffle body), such geometry is not intended to be limiting. For example, the rails, recesses, shelves and other radially extending features described herein and provided a standoff functionality may have curved, curvilinear, and/or discontinuous geometries. Furthermore, the standoff rails and associated optional receiving structures, and the gaps defined thereby, may each be tailored in geometry, shape, orientation, and the like, in the radial, axial, and/or circumferential direction(s) to optimize local pressure loss and internal convective heat transfer characteristics. The standoff rail height and baffle gap height may be tailored both radially and axially to optimize local pressure loss and internal convective heat transfer characteristics.

It will be appreciated that the shape, size, and aspect ratio of the standoff rails (whether on the airfoil body or the baffle body) may have different shapes, sizes, and aspect ratios than that illustrated and described above. That is, the disclosed, described, and illustrated embodiments are intended to be informative and not limiting to the features of the disclosed embodiments and implementations thereof. For example, the standoff rail geometry, height, width, and shape may be dictated by local fin efficiency requirements. In other words, it may be preferable to ensure that the standoff rails do not result in a local hot spot. The standoff rail geometry limitations may be driven by local external local heat flux, backside convection, and external airfoil wall thickness requirements. In accordance with some embodiments, and without limitation, the height and width of the standoff rails can range between 0.2 times to 3 times the local wall thickness of the respective component (e.g., airfoil or baffle). That is, in a direction extending between the baffle surface and the airfoil surface, the standoff rails may have a thickness greater than the local thickness of the respective component that does not include such standoff rail. For example, and without limitation, the thickness of the standoff rails in an extension direction may be a distance of between 20% and 300% of the local component wall thickness.

Advantageously, embodiments described herein provide for improved cooling schemes for airfoils used in gas turbine engines. The cooling schemes include a relatively large leading edge cavity defined within an airfoil body and a space-eater baffle installed therein. The baffle can be fed with cooling air that is directed into radial extending channels that are defined between the exterior surface of the baffle and the interior surfaces of the airfoil.

In accordance with some embodiments, forward radially extending rails can be segmented such that flow from pressure side and suction side radial flow channels into a showerhead radial channel that is defined radially along the leading edge of the airfoil. The air within the showerhead radial channel may be expelled to the exterior of the airfoil through showerhead apertures. This provides a pressure differential to pull cooling flow from the pressure side and suction side radial flow channels into the showerhead radial channel. Aft of the pressure side and suction side radial flow channels may be an aft radial flow channel that is a pass-through channel that directs cooling flow along the pressure and suction side walls and then into an inner diameter platform of the airfoil. Further, in some embodiments, flow can be expelled into the gaspath at various locations along the pressure side and/or suction side, if necessary, to address additional areas with film without compromising the overall effectiveness of the configuration or showerhead region cooling.

In some embodiments, trailing edge impingement apertures may be formed on or in an aft wall of the leading edge baffle. As such, cooling flow from within the leading edge baffle may be impinged upon an interior rib of the airfoil, thus preventing migration between radial cooling flows along the hot walls of the airfoil. Further, in some embodiments, an inner diameter forward collar may be formed as part of the airfoil body and provide support for the leading edge baffle and/or blockage of radial flow, such that through-flow is prevented at the inner diameter of radial flow channels that terminate at the inner diameter forward collar.

As used herein, the terms "about" and "substantially" are intended to include the degree of error associated with measurement of the particular quantity based upon the equipment available at the time of filing the application. For example, "about" or "substantially" may include a range of ±8%, or 5%, or 2% of a given value or other percentage change as will be appreciated by those of skill in the art for the particular measurement and/or dimensions referred to herein. Further, when used with respect to a non-numerical feature, such terms encompass the variability within the bounds of manufacturing, measurement, or understanding within the knowledge and experience of those of skill in the art. The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A baffle for installation within a leading edge cavity of an airfoil body, the baffle comprising:
 a baffle body defining a feed cavity within an interior thereof, the baffle body extending between an outer diameter end and an inner diameter end;
 a forward standoff shelf formed along an exterior surface of the baffle body, the forward standoff shelf defined by a depression, bend, or channel in a material of the baffle body extending from the outer diameter end to the inner diameter end and configured to engage with a forward rail of the airfoil body; and
 an aft standoff shelf formed along an exterior surface of the baffle body, the aft standoff shelf defined by a depression, bend, or channel in the material of the baffle body extending from the outer diameter end to the inner diameter end and configured to engage with an aft rail of the airfoil body,
 wherein a surface of the baffle body between the forward standoff shelf and the aft standoff shelf defines a side channel surface extending in a radial direction along the baffle body between the outer diameter end and the inner diameter end, a showerhead channel surface is defined on the surface of the baffle body forward of the forward standoff shelf, and an aft channel surface defined aft of the aft standoff shelf and extending about an aft exterior surface of the baffle body,
 at least one side feed aperture array is provided proximate the outer diameter end of the side channel surface, the at least one side feed aperture array configured to direct a cooling flow from the feed cavity to the side channel surface on the exterior of the baffle body,
 at least one resupply aperture is provided on the side channel surface arranged at a position between the at least one side feed aperture array and the inner diameter end of the baffle body, the at least one resupply aperture configured to direct flow from the feed cavity to the side channel surface, wherein the side channel surface between the at least one side feed aperture array and the at least one resupply aperture is a solid portion having no apertures or openings.

2. The baffle of claim 1, wherein the baffle body comprises an aft wall having at least one trailing edge impingement aperture formed thereon.

3. The baffle of claim 1, wherein the leading edge baffle is capped at an inner diameter end thereof.

4. The baffle of claim 1, wherein the baffle body comprises a leading edge feed aperture proximate the outer diameter end, the leading edge feed aperture configured to direct a cooling flow therethrough and along the showerhead channel surface on the exterior of the baffle body.

5. The baffle of claim 1, wherein the forward standoff shelf is a pressure side forward standoff shelf and the aft standoff shelf is a pressure side aft standoff shelf, with a pressure side channel surface defined therebetween on a pressure side of the baffle body.

6. The baffle of claim 5, further comprising a suction side forward standoff shelf and a suction side aft standoff shelf arranged on a suction side of the baffle body.

7. The baffle of claim 6, wherein the showerhead channel surface is defined on the exterior surface of the baffle body between the suction side forward standoff shelf and the pressure side forward standoff shelf.

8. The baffle of claim 6, wherein an aft channel surface is defined on the exterior surface of the baffle body extending around an aft end of the baffle body between the suction side aft standoff shelf and the pressure side aft standoff shelf.

9. The baffle of claim 1, wherein at least one of the forward standoff shelf or the aft standoff shelf is shaped to receive and engage with a rail of the airfoil body and a standoff gap is defined between the respective standoff shelf and the rail when the baffle is installed within the airfoil body.

10. The baffle of claim 1, wherein the solid portion extends between the outer diameter end of the baffle body and the inner diameter end of the baffle body.

11. An airfoil assembly comprising:
 an airfoil body defining a leading edge cavity defined between a leading edge of the airfoil body and an interior rib, wherein one or more aft cavities are defined aft of the interior rib, and having a forward radially extending rail and an aft radially extending rail formed on an inner surface of the airfoil body that defines the leading edge cavity; and
 a baffle installed within the leading edge cavity, the baffle comprising:
  a baffle body defining a feed cavity within an interior thereof, the baffle body extending between an outer diameter end and an inner diameter end;
  a forward standoff shelf formed along an exterior surface of the baffle body, the forward standoff shelf defined by a depression, bend, or channel in a material of the baffle body extending from the outer diameter end to the inner diameter end and configured to engage with the forward radially extending rail; and
  an aft standoff shelf formed along an exterior surface of the baffle body, the aft standoff shelf defined by a depression, bend, or channel in the material of the baffle body extending from the outer diameter end to the inner diameter end and configured to engage with the aft radially extending rail,
  wherein a surface of the baffle body between the forward standoff shelf and the aft standoff shelf defines a side channel surface extending in a radial direction along the baffle body between the outer diameter end and the inner diameter end, and
  wherein the baffle body comprises an aft wall having at least one trailing edge impingement aperture formed thereon, wherein the at least one trailing edge impingement aperture is configured to direct an impinging flow against the interior rib during use.

12. The airfoil assembly of claim 11, wherein the leading edge baffle is capped at an inner diameter end thereof.

13. The airfoil assembly of claim 11, wherein the baffle body comprises a leading edge feed aperture proximate the outer diameter end, the leading edge feed aperture configured to direct a cooling flow therethrough and along a showerhead channel surface on the exterior of the baffle body.

14. The airfoil assembly of claim 11, wherein the baffle body comprises at least one side feed aperture array proximate the outer diameter end, the at least one side feed aperture array configured to direct a cooling flow along the side channel surface on the exterior of the baffle body.

15. The airfoil assembly of claim 11, wherein the forward standoff shelf is a pressure side forward standoff shelf and the aft standoff shelf is a pressure side aft standoff shelf, with a pressure side channel surface defined therebetween on a pressure side of the baffle body.

16. The airfoil assembly of claim 11, wherein at least one of the forward standoff shelf or the aft standoff shelf is shaped to receive and engage with a rail of the airfoil body and a standoff gap is defined between the respective standoff shelf and the rail when the baffle is installed within the airfoil body.

17. The airfoil assembly of claim 11, wherein the baffle body comprises a solid portion between at least one feed aperture proximate the outer diameter end of the baffle body and the inner diameter end of the baffle body.

* * * * *